United States Patent
Fakhouri et al.

(10) Patent No.: US 11,701,629 B2
(45) Date of Patent: Jul. 18, 2023

(54) METHODS AND SYSTEM FOR MIXING AND DISPENSING VISCOUS MATERIALS FOR THE CREATION OF ADDITIVE STRUCTURES

(71) Applicant: NIKE, Inc., Beaverton, OR (US)

(72) Inventors: Sami Fakhouri, Beaverton, OR (US); Askim Senyurt, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 511 days.

(21) Appl. No.: 16/635,944

(22) PCT Filed: Jun. 3, 2019

(86) PCT No.: PCT/US2019/035242
§ 371 (c)(1),
(2) Date: Jan. 31, 2020

(87) PCT Pub. No.: WO2019/236493
PCT Pub. Date: Dec. 12, 2019

(65) Prior Publication Data
US 2020/0306704 A1   Oct. 1, 2020

Related U.S. Application Data

(60) Provisional application No. 62/680,344, filed on Jun. 4, 2018.

(51) Int. Cl.
*B01F 27/806*     (2022.01)
*B33Y 30/00*     (2015.01)
(Continued)

(52) U.S. Cl.
CPC ............ *B01F 27/806* (2022.01); *B01F 23/47* (2022.01); *B01F 27/92* (2022.01);
(Continued)

(58) Field of Classification Search
CPC ...... B29C 48/387; B29C 48/395; B29C 48/45
See application file for complete search history.

(56) References Cited

U.S. PATENT DOCUMENTS

| | | | | |
|---|---|---|---|---|
| 3,189,325 A | | 6/1965 | Levy | |
| 3,280,425 A | * | 10/1966 | Beck | B29C 48/63 366/78 |

(Continued)

FOREIGN PATENT DOCUMENTS

| | | |
|---|---|---|
| GB | 2105064 A | 3/1983 |
| WO | 2013149273 A1 | 10/2013 |
| WO | 2017004637 A1 | 1/2017 |

OTHER PUBLICATIONS

Ober et al. "Active mixing of complex fluids at the microscale," Proceedings of the National Academy of Sciences 112(40): 12293-12298, Oct. 2014 (Year: 2014).*

(Continued)

*Primary Examiner* — Joseph S Del Sole
*Assistant Examiner* — Ariella Machness
(74) *Attorney, Agent, or Firm* — Klarquist Sparkman, LLP

(57) ABSTRACT

Various methods and systems are provided for mixing and dispensing viscous materials for the creation of additive structures. As one example, during a mixing and dispensing operation of a multi-dimensional printing apparatus, one or more liquids may flow into a mixing chamber via one or more material inlets arranged in a wall of the mixing chamber below a high pressure bearing of a mixing rod positioned within the mixing chamber; and movement of a mixing rod positioned within the mixing chamber is adjusted based on an operating condition of the printing apparatus.

16 Claims, 11 Drawing Sheets

(51) Int. Cl.
  *B29C 64/314* (2017.01)
  *B29C 64/209* (2017.01)
  *B29B 7/76* (2006.01)
  *B01F 27/92* (2022.01)
  *B01F 35/21* (2022.01)
  *B01F 35/71* (2022.01)
  *B33Y 50/02* (2015.01)
  *B33Y 40/10* (2020.01)
  *B01F 23/47* (2022.01)

(52) U.S. Cl.
  CPC ...... *B01F 35/2114* (2022.01); *B01F 35/7176* (2022.01); *B29B 7/7631* (2013.01); *B29C 64/209* (2017.08); *B29C 64/314* (2017.08); *B33Y 30/00* (2014.12); *B33Y 40/10* (2020.01); *B33Y 50/02* (2014.12)

(56) References Cited

U.S. PATENT DOCUMENTS

| | | | |
|---|---|---|---|
| 4,419,014 | A | 12/1983 | Gale |
| 4,486,102 | A | 12/1984 | Thiele et al. |
| 4,523,696 | A | 6/1985 | Commette et al. |
| 6,328,229 | B1 | 12/2001 | Duronio et al. |
| 7,070,318 | B2 | 7/2006 | Renfro |
| 8,147,122 | B2 | 4/2012 | Pieroni |
| 11,230,054 | B1* | 1/2022 | Church ............... B29C 48/2511 |
| 2003/0004599 | A1 | 1/2003 | Herbak |
| 2007/0128372 | A1 | 6/2007 | Wirth et al. |
| 2009/0071336 | A1* | 3/2009 | Jernberg ............. B01F 27/1142 366/314 |
| 2010/0020631 | A1 | 1/2010 | Gansmuller et al. |
| 2015/0055434 | A1 | 2/2015 | Mader |
| 2015/0183167 | A1 | 7/2015 | Molinari et al. |
| 2017/0120513 | A1 | 5/2017 | Brennan |
| 2017/0122322 | A1* | 5/2017 | Zinniel ................. B22F 12/10 |
| 2017/0355865 | A1 | 12/2017 | Fenn et al. |
| 2018/0133670 | A1 | 5/2018 | Lewis et al. |
| 2020/0338824 | A1* | 10/2020 | Cardon ................... B29B 7/60 |

OTHER PUBLICATIONS

Ober et al. "Active mixing of complex fluids at the microscale," Supplemental Information, Proceedings of the National Academy of Sciences 112(40): 12293-12298, Oct. 2014 (Year: 2014).*

European Patent Office, Extended European Search Report Issued in Application No. 19814751.4, dated Apr. 22, 2020, Germany, 9 pages.

ISA United States Patent and Trademark Office, International Search Report and Written Opinion Issued in Application No. PCT/US2019/035242, dated Aug. 27, 2019, WIPO, 82 pages.

Ober et al., "Active mixing of complex fluids at the microscale," *Proceedings of the National Academy of Sciences* 112(40): 12293-12298, Oct. 2015.

* cited by examiner

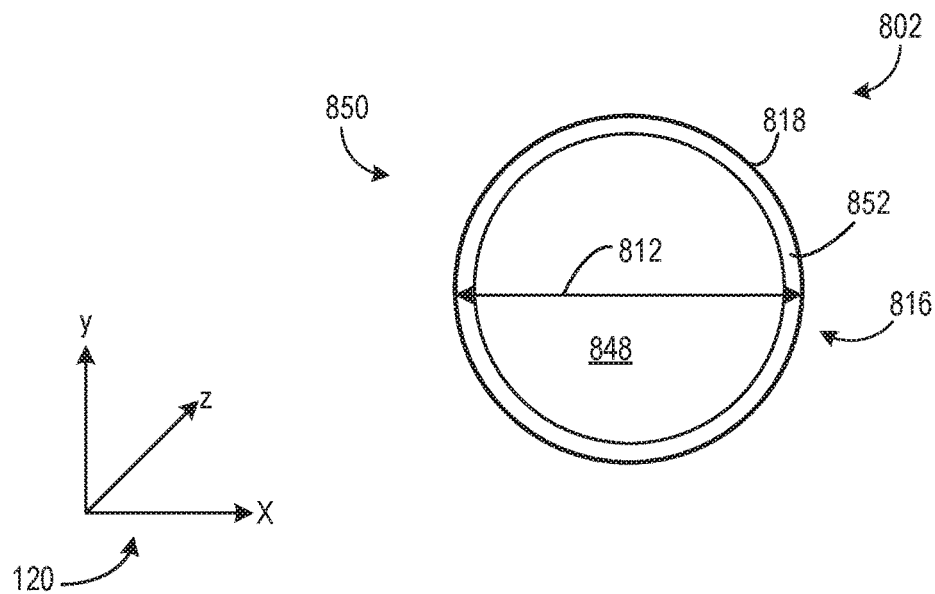
FIG. 8B
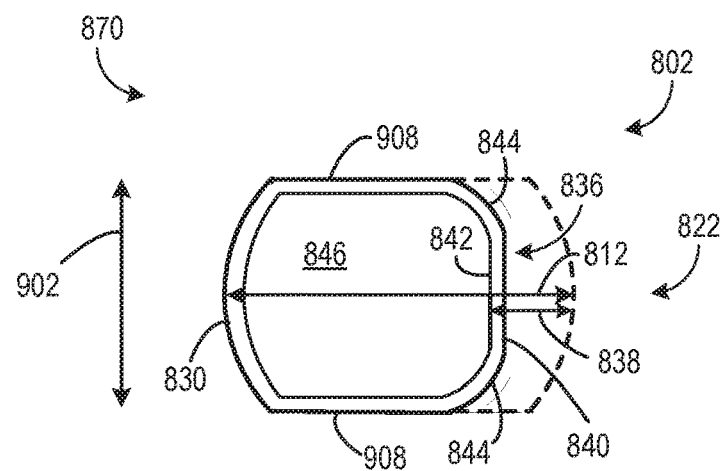
FIG. 8C
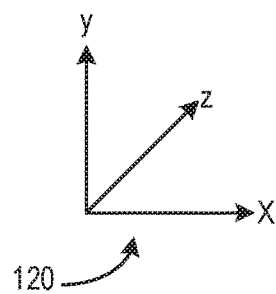

METHODS AND SYSTEM FOR MIXING AND DISPENSING VISCOUS MATERIALS FOR THE CREATION OF ADDITIVE STRUCTURES

CROSS REFERENCE TO RELATED APPLICATIONS

The present application claims priority to International Application No. PCT/US2019/035242 entitled "METHODS AND SYSTEM FOR MIXING AND DISPENSING VISCOUS MATERIALS FOR THE CREATION OF ADDITIVE STRUCTURES," filed on Jun. 3, 2019. International Application No. PCT/US2019/035242 claims priority to U.S. Provisional Application No. 62/680,344, entitled "METHODS AND SYSTEM FOR MIXING AND DISPENSING VISCOUS MATERIALS FOR THE CREATION OF ADDITIVE STRUCTURES", and filed on Jun. 4, 2018. The entire contents of the above-listed application are hereby incorporated by reference for all purposes.

FIELD

The present description relates generally to a mixing and dispensing head for mixing and dispensing viscous, reactive liquids to create additive structures.

BACKGROUND

Additive manufacturing is used to build multi-dimensional objects by adding layer-upon-layer of materials. Additive manufacturing technologies may utilize a computer, 3D modeling software, additive manufacturing equipment, and layering material. Once a computer model of the desired object is created, the additive manufacturing equipment lays down or adds successive layers of a material (e.g., liquid) in a layer-upon-layer fashion, and/or successive side-by-side lines of material, to fabricate the desired 3D object, based on data of the computer model. One example of an additive manufacturing technique is multi-dimensional printing using a multi-dimensional (e.g., three dimensional, 3D) printer with a multi-dimensional printing head. The multi-dimensional printing head may be used to mix and dispense one or more viscous, reactive materials to create additive structures. In one embodiment, the mixing and dispensing head (e.g., 3D printing head) may mix and dispense one or more viscous, reactive liquids to create outsole components for footwear.

BRIEF DESCRIPTION OF THE DRAWINGS

FIG. 8B shows a first cross-section of the example of the mixing rod of FIG. 8A.

FIG. 8C shows a second cross-section of the example of the mixing rod of FIG. 8A.

FIGS. 2-5 and 8A-10 are shown to scale, though other relative dimensions may be used, if desired.

DETAILED DESCRIPTION

Figure 1:
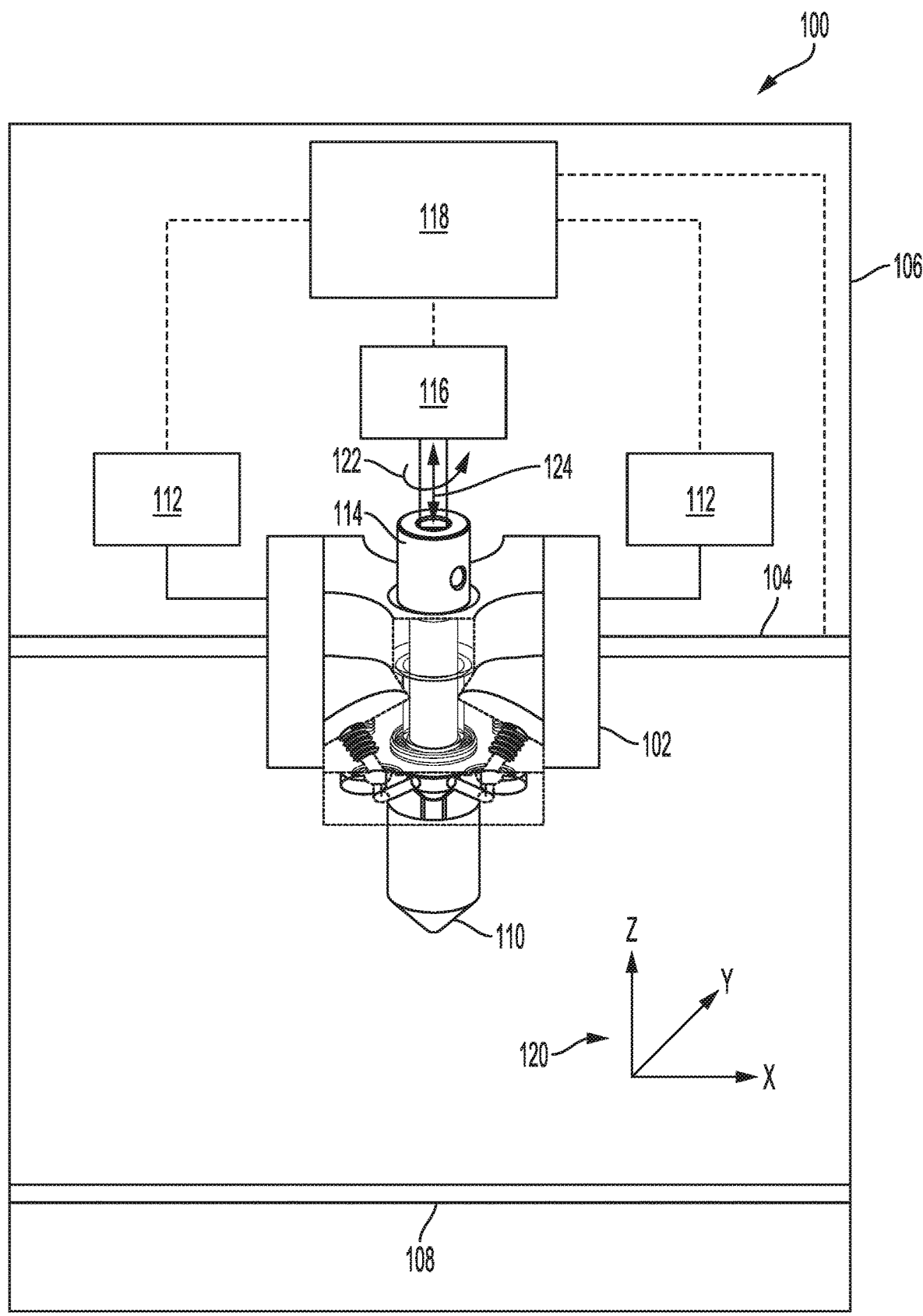
FIG. 1 shows an embodiment of a system for mixing and dispensing viscous, reactive liquids to create additive structures.

Systems and methods are provided for mixing and dispensing viscous materials for the creations of additive structures. As one example, an additive manufacturing system (which may be a multi-dimensional printing apparatus, in one embodiment), such as the additive manufacturing system shown in FIG. 1 may include a mixing and dispensing head adapted to mix and dispense one or more reactive, viscous materials onto a deposition surface for the creation of additive structures. In one example, the materials mixed and dispensed via the mixing and dispensing head and the methods described herein may be used to create outsole components for footwear. A mixing chamber of the mixing and dispensing head is formed between an outer wall of a mixing rod, which extends along a length of an interior of the mixing and dispensing head, and an outer mixing chamber wall, as shown in FIGS. 2-5 and 8A-10. As also shown in FIGS. 2-5 and 8A-10, a tapered shape of the mixing rod and mixing chamber may be chosen to efficiently and accurately deposit material for forming desired additive structures. As shown in FIG. 1, the mixing rod is coupled to a motor to allow both rotational and linear movement of the mixing rod around and along a central axis of the mixing rod. The linear movement of the mixing rod may adjust an interior volume of the mixing chamber, while the mixing rod rotates about the central axis to mix the one or more materials. One or more pumps may pump the one or more materials for mixing into the mixing chamber and the linear position of the mixing rod may be continuously adjusted based on changes in velocity (or flow rate or amount of material pumped by) of the one or more pumps. In this way, the mixed material may be deposited onto the deposition surface at a desired rate for creating a desired structure, according to the method shown by FIG. 7.

FIGS. 1-5 and 8A-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 shows an embodiment of a system for mixing and dispensing viscous, reactive liquids to create additive structures. Specifically, FIG. 1 shows an additive manufacturing system 100, which may be a multi-dimensional (e.g., 3D) printing system including a multi-dimensional (e.g., 3D) printing apparatus. The system 100 includes a mixing and dispensing head 102 that is coupled to a gantry 104 included in a housing 106 of the system 100. A deposition surface (e.g., substrate) 108 may be included at a base, or bottom, of the housing 106. The mixing and dispensing head 102 includes a dispensing nozzle 110 which is adapted to deposit mixed material from the mixing and dispensing head 102 onto the deposition surface. The gantry may adjust, via a motor of the gantry, the position (e.g., x, y, and/or z position, as shown by axis system 120) of the mixing and dispensing head 102 in order to create additive structures, layer-by-layer or side-by-side, or lines of extruded material, on the deposition surface 108. One or more pumps (e.g., material pumps) 112 are coupled to the mixing and dispensing head 102 and are adapted to flow material (e.g., one material per pump) into a mixing chamber of the mixing and dispensing head 102 at a metered rate (e.g., at a pump flow rate or velocity). In one example, the one or more pumps 112 are positive displacement pumps. A mixing rod 114 of the mixing and dispensing head 102 is coupled to a motor 116. The motor 116 is adapted to both rotate (shown by direction arrow 122) and linearly move (shown by direction arrow 124) the mixing rod around and along (in two directions) a central axis of the mixing and dispensing head 102, as described further below with reference to FIGS. 2-6 and 8A-10. In an alternate embodiment, two motors may be coupled to the mixing rod, where each motor is adapted to either linearly move or rotate the mixing rod.

The system 100 includes a controller (e.g., electronic controller) 118 in electronic communication with the one or more pumps 112, the motor 116, and a motor/actuator of the gantry 104. Controller 118 may be a microcomputer, including a microprocessor unit, input/output ports, and an electronic storage medium (e.g., memory) for executable programs, calibration values, and uploaded data (such as 3D computer models, such as a CAD model). Controller 118 may be programmed with computer readable data representing instructions executable to perform the methods described below as well as other variants that are anticipated but not specifically listed. The components of system 100 may be controlled at least partially by controller 118. Controller 118 may receive various signals from sensors of system 100, and send control signals to various actuators included in the system 100. The various sensors may include, for example, various position, flow rate, and speed sensors of the gantry 104, mixing and dispensing head 200 of FIGS. 2-5, motor 116, and pumps 112. The various actuators may include, for example, pumps 112, motor 116, and a motor of gantry 104. According to instructions stored in memory of the controller 118 and one or more computer models (such as a CAD model) uploaded to the controller 118, the controller may adjust the position of the mixing and dispensing head 102 (in one, two, or three directions) via the gantry 104, adjust a velocity of the one or more pumps 112 and/or start/stop the one or more pumps 112, start/stop and or adjust a rate of rotation of the mixing rod via the motor 116, and adjust a linear position (along direction 124) of the mixing rod 114 via the motor 116. In this way, a desired structure, as defined by the uploaded computer model, may be created, additively (e.g., layer-by-layer) with the additive manufacturing system 100. Additionally, as discussed further below, the controller 118 may send electrical commands to the motor 116 to adjust the rotational speed and/or linear position of the mixing rod 114 based on feedback signals received from pumps 112 (e.g., flow rate signals and/or pump commands) and according to operating parameters based on the uploaded computer model.

As shown in FIG. 1, the controller 118, pump(s) 112, motor 116, gantry 104, mixing and dispensing head 102, and deposition surface 108 may all be contained entirely within the housing 106. However, in alternate embodiments, the controller 118 and pump(s) 112 may be arranged outside (e.g., external to) the housing 106. In yet other embodiments, the housing 106 may be a structural frame to which the gantry 104 and mixing and dispensing head 102 is mounted and the deposition surface 108 may be arranged below or at a base of the structural frame.

Figure 2:
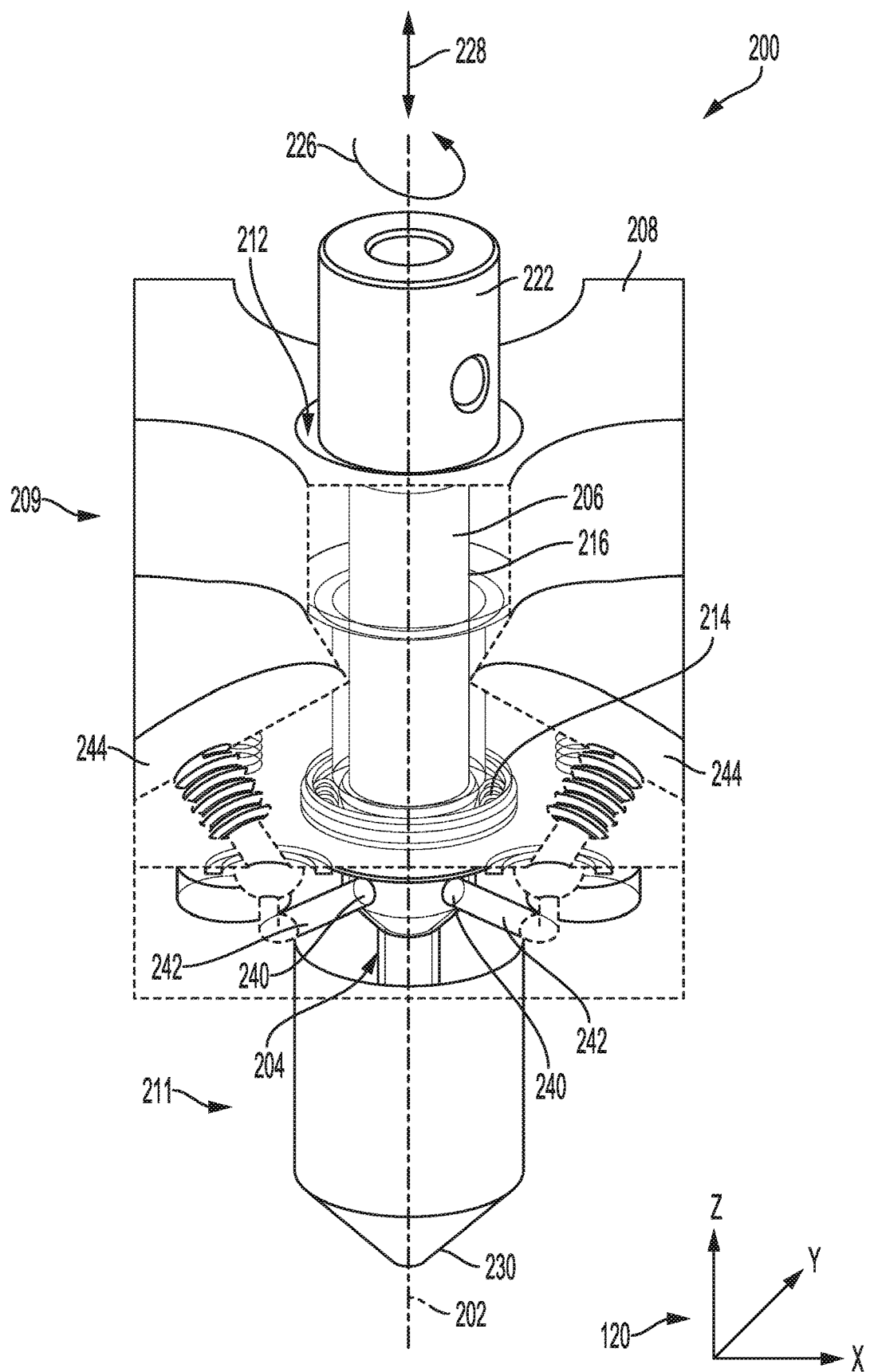
FIG. 2 shows a first, isometric view of an embodiment of a mixing and dispensing head used in the system of FIG. 1.
Figure 3:
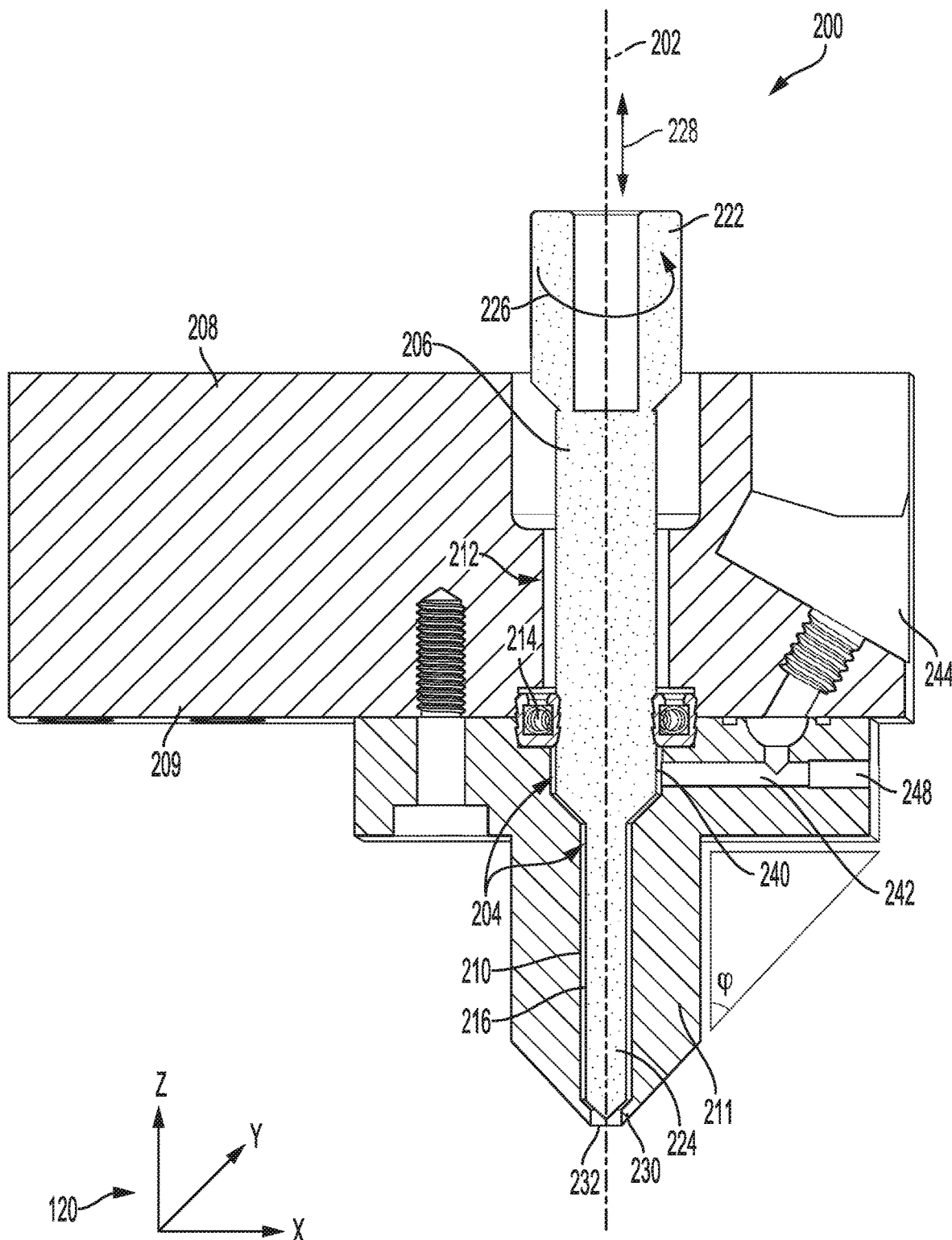
FIG. 3 shows a second, sectional view of the embodiment of the mixing and dispensing head of FIG. 2.
Figure 4A:
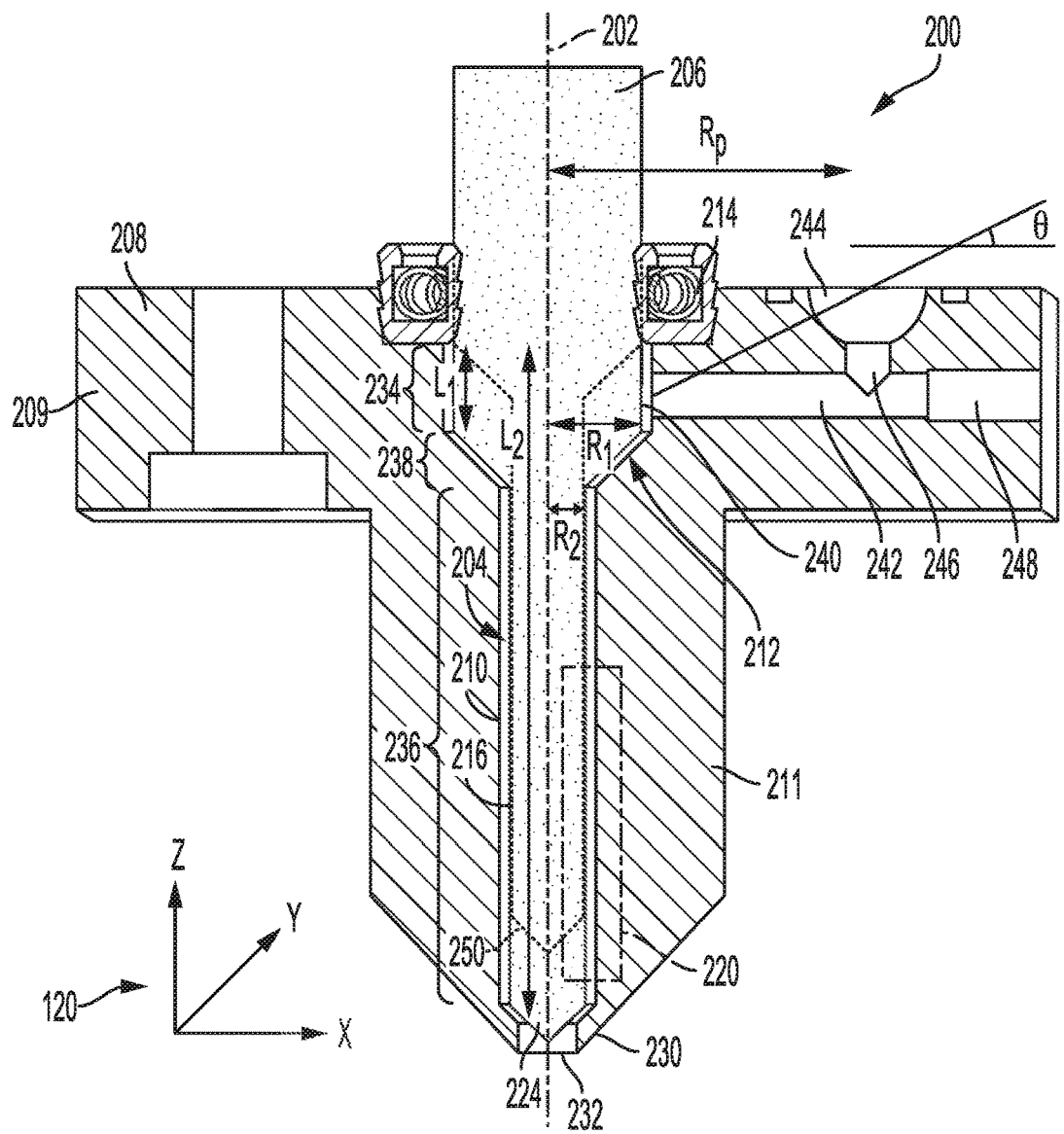
FIG. 4A shows a third, sectional view of the embodiment of the mixing and dispensing head of FIG. 2.
Figure 4B:
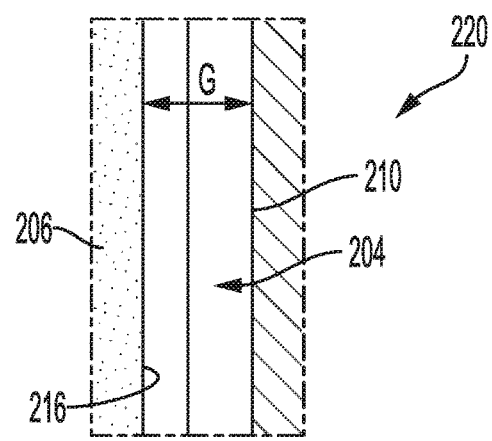
FIG. 4B shows a detailed view of a section of the embodiment of the mixing and dispensing head of FIG. 2.
Figure 5:
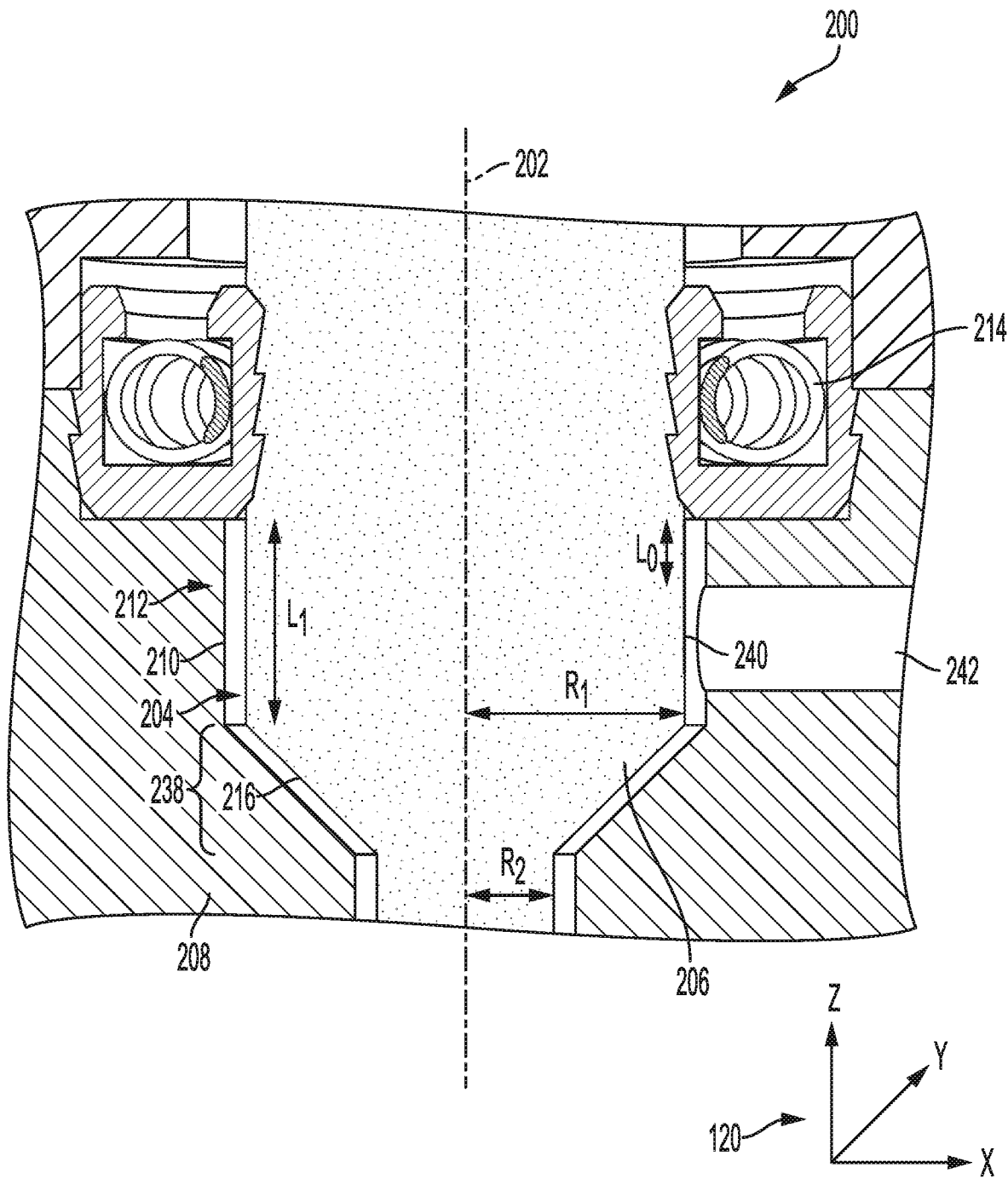
FIG. 5 shows a fourth, sectional view of the embodiment of the mixing and dispensing head of FIG. 2.

FIGS. 2-5 show an embodiment of a mixing and dispensing head 200 used in the system of FIG. 1. Mixing and dispensing head 200 may be the mixing and dispensing head 102 of FIG. 1. FIG. 2 shows an isometric view of the mixing and dispensing head 200, FIG. 3 shows a first sectional view of the mixing and dispensing head 200, FIG. 4A shows a second sectional view of the mixing and dispensing head 200 with a detailed view of the mixing chamber wall shown in FIG. 4B, and FIG. 5 shows a zoomed-in, sectional view of the high pressure bearing and a material inlet of the mixing and dispensing head 200. Each of FIGS. 2-5 include axis system 120 showing an x, y, and z-axis for reference. The mixing and dispensing head 200 has a central axis 202 which is arranged parallel to the z-axis of axis system 120, which may be referred to as a vertical axis. The central axis 202 is a common, central axis to a mixing chamber 204 and mixing rod 206 of the mixing and dispensing head 200.

As shown in FIGS. 2-5, the mixing and dispensing head 200 includes a housing (e.g., outer housing) 208 which may also be referred to as a body of the mixing and dispensing head 200. The housing 208 is broken up into a mixing head upper body 209 and mixing head lower body 211. The mixing rod 206 is positioned within a bore 212 in the housing 208. An inner wall of the bore 212, below a high pressure bearing 214 of the mixing rod (as seen in FIGS. 4A, 4B, and 5), forms a mixing chamber wall 210 which may be an outer wall of the mixing chamber 204. As best seen in the detailed view 220 of FIG. 4B and the zoomed-in view of FIG. 5, the mixing chamber 204 is annular and formed between and by the mixing chamber wall 210 and an outer surface (e.g., outside) 216 of the mixing rod 206. The gap, G, between the outer surface 216 of the mixing rod 206 and the mixing chamber wall 210 is shown in the detailed view 220 of FIG. 4B. One or more liquids may be mixed within this gap G, in the mixing chamber 204.

The mixing rod 206 and mixing chamber 204 both have a tapered shaped. As shown in FIG. 4A, at top portion 234 of the mixing rod 206 and mixing chamber 204 (which is closest to and arranged adjacent to the high pressure bearing 214), the mixing rod 206 has a larger, first radius, $R_1$, and the mixing chamber has a larger, first radius (or first outer diameter which is double the first radius) which is $R_1+G$. At a bottom portion 236 of the mixing rod 206 and mixing chamber 204 (which is arranged closer to a dispensing nozzle 230 than the top portion 234), the mixing rod 206 has a smaller, second radius, $R_2$, and the mixing chamber 204 has a smaller, second radius (or second outer diameter which is double the second radius) which is $R_2+G$. A tapered portion 238 of the mixing rod 206 and mixing chamber 204 is arranged between the top portion 234 and bottom portion 236 and serves as an angled transition (e.g., angled relative to the central axis 202) between the top and bottom portions. Additionally, at an end of the bottom portion 236, the mixing rod 206 and mixing chamber 204 each taper further, inward toward the central axis 202. Specifically, the mixing rod 206 tapers further to a point and the mixing chamber 204 tapers to an outlet aperture 232 of the dispensing nozzle 230. A length, $L_1$, between the high pressure bearing 214 (e.g., a bottom of the high pressure bearing 214) and a top of the tapered portion (e.g., taper) 238 is shown in FIG. 4A, as well as a length, $L_2$, between the high pressure bearing 214 (e.g., a bottom of the high pressure bearing 214) and the outlet aperture 232 of the dispensing nozzle 230 (e.g., an end of the mixing chamber 204).

As shown in FIG. 3, the mixing rod 206 includes a proximal end 222 and distal end 224, the proximal end 222 arranged opposite the distal end 224. The proximal end 222 is adapted to couple to an actuator of a motor, such as motor 116 shown in FIG. 1. In this way, the mixing rod 206 is adapted to rotate about (e.g., around) the central axis 202, as shown by arrow 226, and adapted to translate (e.g., move) linearly, in two directions, at least along central axis 202, as shown by arrow 228 (as shown in FIGS. 2 and 3). Though the arrow 226 shows rotation of the mixing rod 206 in a counter-clockwise direction, in alternate embodiments, the direction of rotation of the mixing rod 206 may be clockwise. In yet other embodiments, the motor may rotate the mixing rod 206 in either or both of a clockwise and/or counter-clockwise direction about the central axis. Further, the mixing rod 206 may move linearly, back and forth along the central axis 202, from a fully extended position (as shown in FIGS. 3 and 4A) to a fully retracted position (as shown by the dashed line 250 in FIG. 4A). In the fully extended position, the distal end 224 is arranged adjacent to a dispensing nozzle 230 of the mixing and dispensing head 200. In some embodiments, in the fully extended position, the distal end 224 may be positioned at and in face-sharing contact with a distal end wall of the mixing chamber 204 which connects directly to the outlet aperture 232 of the dispensing nozzle 230 through which mixed liquid is dispensed onto a deposition surface (such as deposition surface 108 shown in FIG. 1). In the fully retracted position, as shown by dashed line 250 in FIG. 4A, the distal end 224 of the mixing rod 206 is positioned away from (e.g., not adjacent to and not contacting) the outlet aperture 232 of the dispensing nozzle 230 by a threshold distance. In one embodiment, the threshold distance may be in a range of 2.5-3.5 mm. In another embodiment, the threshold distance may be 3 mm+/−a small machining tolerance (such as 0.01 mm). Thus, the threshold distance may be the travel distance of the mixing rod 206 during operation (e.g., mixing and dispensing operation) of the mixing and dispensing head 200. The mixing rod 206 may be continuously adjustable into a plurality of positions between the fully extended and fully retracted positions and including the fully retracted and fully extended positions. In one example, as depicted in FIGS. 4A and 5, the travel distance, or threshold distance between the fully extended and fully retracted positions of the mixing rod 206, is the length, $L_1$, between the high pressure bearing 214 (e.g., a bottom of the high pressure bearing 214) and a top of the taper 238 of the mixing rod 206. The length $L_1$ determines the dynamic volume, $V_D$, or the maximum change in interior volume of the mixing chamber 204 achievable by movement of the mixing rod 206, as explained further below. As shown in FIG. 4A, by linearly moving the mixing rod 206 to the fully retracted position, as shown by dashed line 250, the volume of the mixing chamber 204 increases (e.g., see additional area between outer surface of narrower radius $R_2$ of the mixing rod 206 and mixing chamber wall 210 created when in this retracted position).

The mixing rod 206 is shown in FIGS. 2-5 with the bottom portion 236 adapted with a smooth, straight outer surface 216. In other examples, however, a bottom portion of a mixing rod of a mixing and dispensing head may instead have cutaways to increase mixing of materials in the mixing chamber. An embodiment of a mixing rod 802 is shown in FIGS. 8A-10, depicted in a first profile view 800 in FIG. 8A, a second profile view 900 in FIG. 9, and in a third view 1000 in FIG. 10 with the mixing rod 802 positioned in a mixing chamber of a mixing and dispensing head, such as the mixing and dispensing head 200 of FIGS. 2-5. Axis system 120 is also included in FIGS. 8A-10.

The mixing rod 802 may be a hollow, elongate, single continuous unit and has a top portion 804 arranged above, with respect to the z-axis, a bottom portion 806. A lip 803 may divide the top portion 804 from the bottom portion 806. The top portion 804 may include a proximal end 808 adapted to couple to an actuator of a motor (e.g., motor 116 of FIG. 1), similar to the proximal end 222 of the mixing rod 206 of FIGS. 2-5. The coupling of the mixing rod 802 to the actuator may enable the mixing rod 802 to rotate about a central axis 801 of the mixing rod 802 as well as translate linearly, in two directions, along the central axis 801. A rotation of the mixing rod 802 along a first direction is indicated by arrow 1008 in FIGS. 8A, 9, and 10, and linear motion of the mixing rod 802 is indicated by arrow 807. In other examples, the mixing rod 802 may be configured to rotate in a second direction (not shown), opposite of the first direction as indicated by arrow 1008.

Figure 8A:
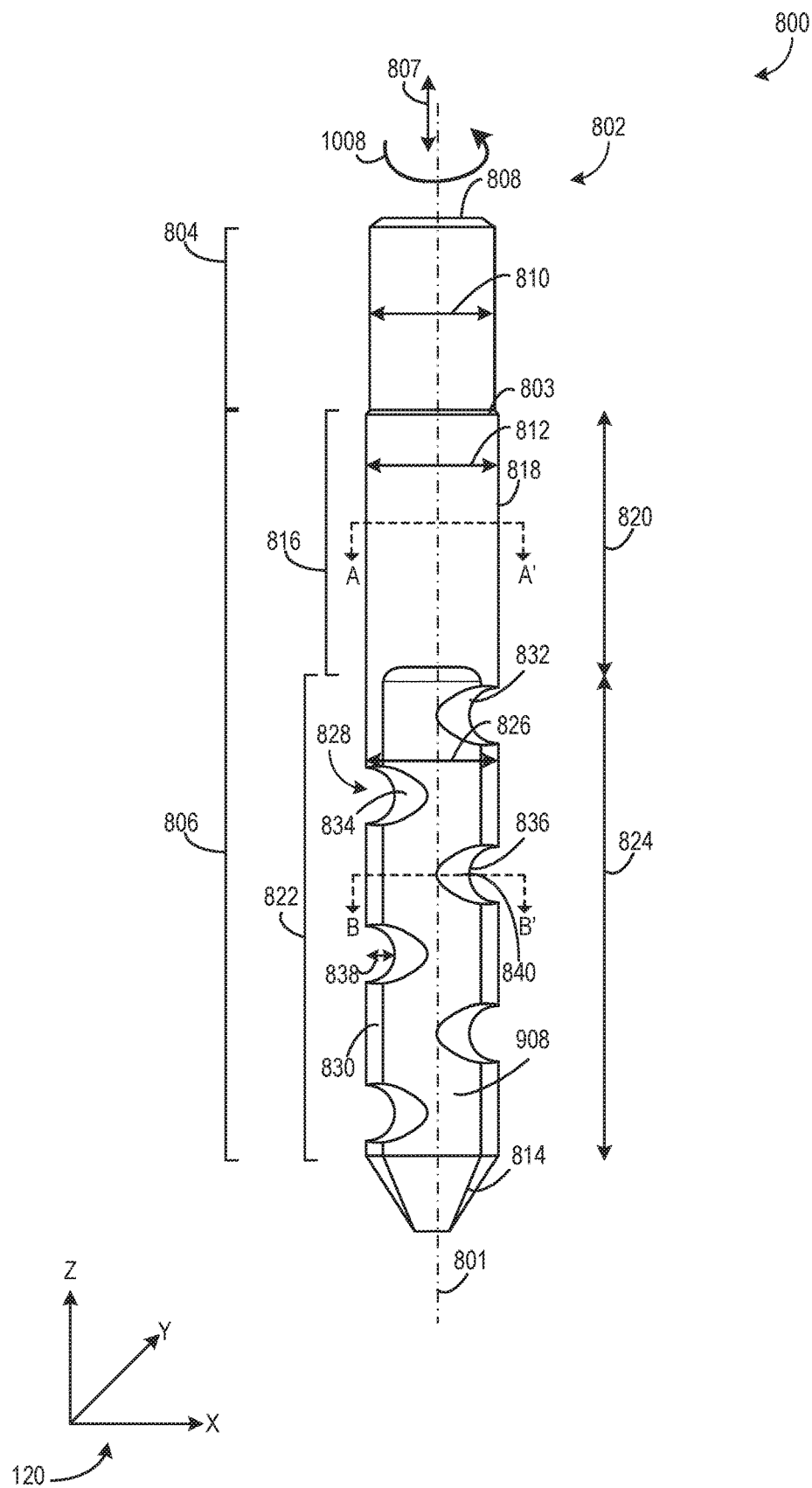
FIG. 8A shows a first, profile view of an example of a mixing rod that may be adapted to a mixing and dispensing head.

A diameter 810, as shown in FIG. 8A, of the top portion 804 may be similar to or smaller than an overall diameter 812 of the bottom portion 806, unlike the mixing rod 206 of FIGS. 2-5. The mixing rod 802 may also include a distal end 814, opposite of the proximal end 808, which tapers inwards, towards the central axis 801 of the mixing rod 802, similar to the distal end 224 of the mixing rod 206 of FIGS. 2-5. When the mixing rod 802 is in a fully extended position, the distal end 814 may be adjacent to a dispensing nozzle of the mixing and dispensing head (e.g., the dispensing nozzle 230 of FIGS. 2-5) and when the mixing rod 802 is in a fully retracted position, the distal end 814 may be spaced away from an outlet aperture (e.g., the outlet aperture 232 of FIGS. 2-5) of the dispensing nozzle by a greater distance than when in the fully extended position.

The bottom portion 806 of the mixing rod 802 may include a first section 816 with a smooth, continuous outer surface 818 that is parallel with the central axis 801 along a length 820 of the first section 816. A first cross-section 850 of the first section 816 is depicted in FIG. 8B, taken along line A-A' as shown in FIG. 8A. The cross-section 850 showing a circular outer geometry of the first section 816 of the bottom portion 806 of the mixing rod 802. A wall 852 of the first section 816 is thin relative to the diameter 812 of the first section 816 of the bottom portion 806 of the mixing rod 802.

As shown in FIG. 8A, a second section 822 of the bottom portion 806 of the mixing rod 802 continues downwards, along the z-axis, from the first section 816 and has a length 824 which is longer than the length 820 of the first section 816. The second section 822 may have a first diameter 826, as shown in FIG. 8A, along the z-x plane in regions between cutaways of a plurality of semi-circular cutaways 828 that is similar to the diameter 812 of the first section 816 of the bottom portion 806 of the mixing rod 802. Along the z-y plane, however, as shown in FIG. 9, the second section 822 of the bottom portion 806 of the mixing rod 802 may have a second diameter 902 that is smaller than the diameter 812 of the first section 816 of the bottom portion 806 of the mixing rod 802.

Figure 9:
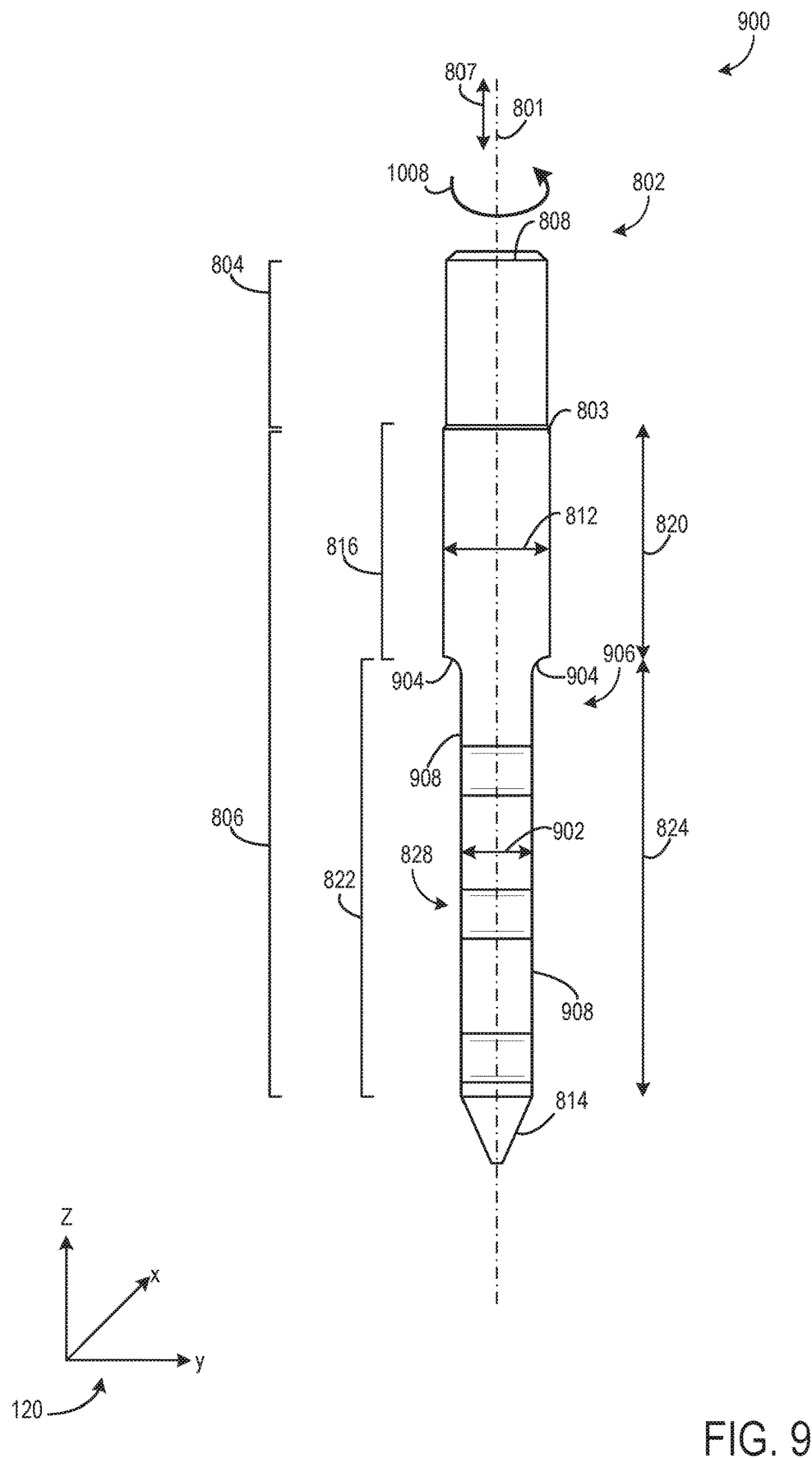
FIG. 9 shows a second, profile view of the example of the mixing rod of FIG. 8.
Figure 10:
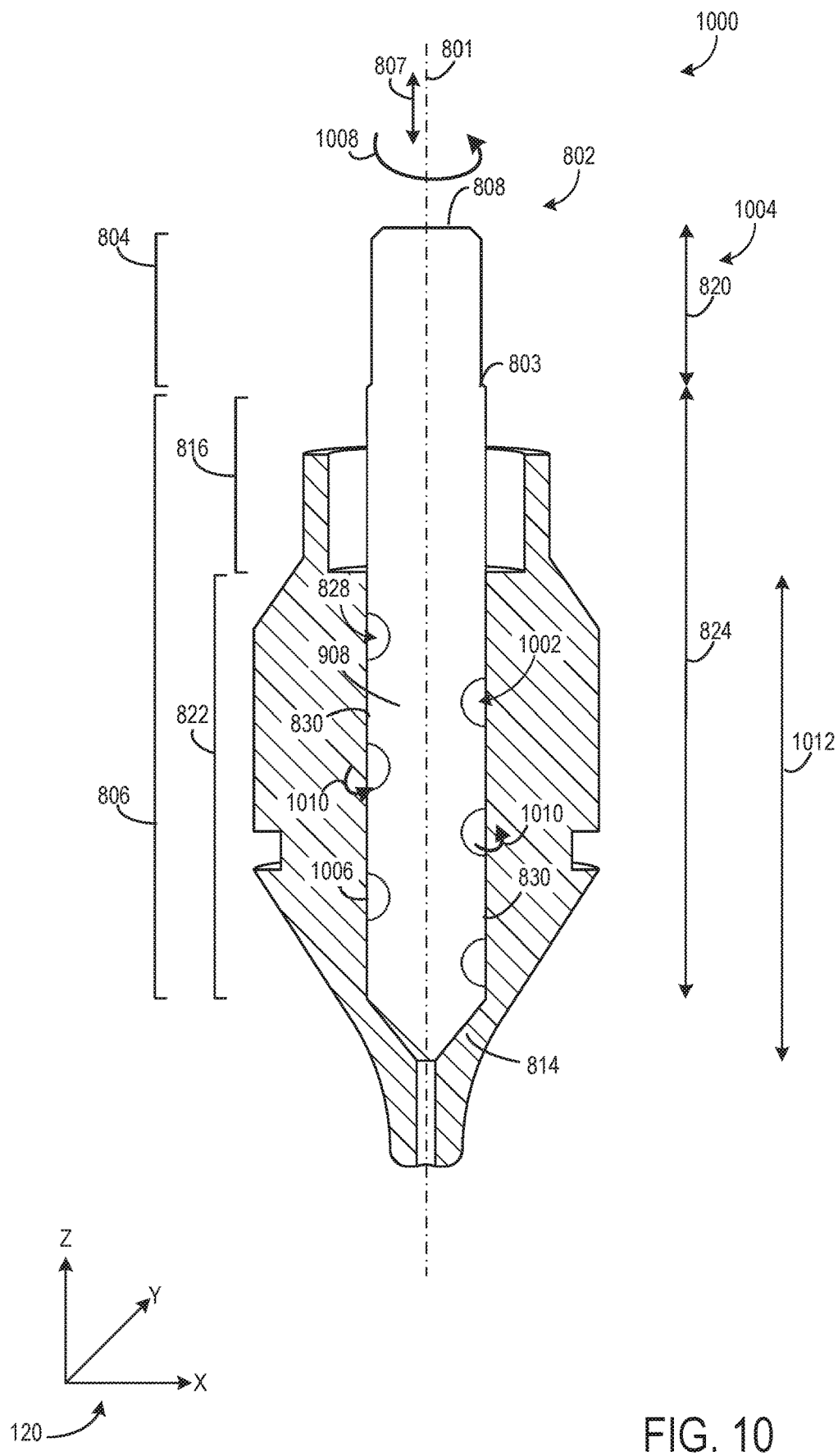
FIG. 10 shows a third view of the example of the mixing rod of FIG. 8 positioned in a mixing chamber.

As shown in FIG. 9, the first section 816 transitions to the second section 822 of the bottom portion 806 of the mixing rod 802 through curved surfaces 904 at an intersection of the first section 816 and the second section 822. In other words, the second section 822 has a set of longitudinal cutaways 906, extending along the entire length 824 of the second section 822 that reduces a width of the second section 822, the width measured along the y-axis and equal to the second diameter 902, of the second section 822 relative to the first section 816 of the bottom portion 806 of the mixing rod 802. The set of longitudinal cutaways 906 are arranged along opposite sides of the mixing rod 802 and offset from the plurality of semi-circular cutaways 828 along the central axis 801, the plurality of semi-circular cutaways 828 described further below. The set of longitudinal cutaways 906 forms flat side surfaces 908 extending along the entire length 824 of the bottom portion 806 of the mixing rod 802 and may be arranged co-planar with the z-x plane. The width of the mixing rod 802 in the z-y plane (e.g., the second diameter 902) may be uniform along the length 824 of the second section 822 of the bottom portion 806 of the mixing rod 802.

Returning to the first profile view 800 shown in FIG. 8A, the second section 822 of the bottom portion 806 of the mixing rod 802 also includes the plurality of semi-circular cutaways 828, e.g., semi-circular when viewed along the y-axis. Each of the plurality of semi-circular cutaways 828 curves inwards, along the z-axis and towards the central axis 801 from curved outer surfaces 830 of the bottom portion 806 of the mixing rod 802, the curved outer surfaces 830 formed of segments separated by cutaways of the plurality of semi-circular cutaways 828. The plurality of semi-circular cutaways 828 may be arranged in a staggered pattern along the length 824 of the second section 822 of the bottom portion 806 of the mixing rod 802. For example, placement of the plurality of semi-circular cutaways 828 alternates between a right side and a left side of the mixing rod 802, relative to the first profile view 800 of FIG. 8A, along the length 824 of the second section 822 of the bottom portion 806 of the mixing rod 802 so that adjacent cutaways are not aligned along the z-axis. As such, a first cutaway 832 of the plurality of semi-circular cutaways 828 is arranged on the right side of the second section 822 and a second cutaway 834 of the plurality of semi-circular cutaways 828 is positioned below the first cutaway 832, with respect to the z-axis, and on the left side of the second section 822. A third cutaway 836 of the plurality of semi-circular cutaways 828 is positioned below the second cutaway 834 and on the right side of the second section 822, and so on. As such, each cutaway of the plurality of semi-circular cutaways 828 is offset from, e.g., not aligned with, adjacent cutaways along the x-axis. However, the plurality of semi-circular cutaways may be aligned along the z-axis, forming two rows of cutaways along the right side and the left side of the second section 822 of the bottom portion 806 of the mixing rod 802. A depth 838 of each of the plurality of semi-circular cutaways 828 may be less than half of the width (e.g., the first diameter 826) of the second section 822 of the bottom portion 806 of the mixing rod 802 and may range between 20%-40% of the width of the second section 822.

A second cross-section 870, taken along line B-B' as shown in FIG. 8A, is depicted in FIG. 8C. The second cross-section 870 provides a cutaway view of the second section 822 of the bottom portion 806 of the mixing rod 802 along a mid-point 840 of the third cutaway 836, as shown in FIG. 8A, of the plurality of semi-circular cutaways 828 shown in FIG. 8A. At the mid-point 840 of the third cutaway 836, the second cross-section 870 of FIG. 8C shows that the third cutaway 836 has a flat wall 842 co-planar with the z-y plane on the right side. The flat wall 842 couples to the side surfaces 908 of the second section 822 of the bottom portion 806 of the mixing rod 802 via curved panels 844. An inner cross-sectional area 846 of the second section 822 at the mid-point 840 of the third cutaway 836 is smaller than an inner cross-sectional area 848 of the first section 816 of the bottom portion 806 of the mixing rod 802, as shown in FIG. 8B, the inner cross-sectional area 846 shown in FIG. 8C reduced by the depth 838 of the third cutaway 836 and by the flat side surfaces 908.

Cross-sections of the second section 822 of the bottom portion 806 of the mixing rod 802 along a mid-point of an oppositely arranged cutaway of the plurality of semi-circular cutaways 828 may have a similar but oppositely configured geometry. For example, a cross-section of the second cutaway 834, as shown in FIG. 8A, may have a cross-section similar to that second cross-section 870 of FIG. 8C but rotated 180 degrees. Furthermore cross-sections of regions between cutaways of the plurality of semi-circular cutaways 828 may be symmetric about the central axis 801, resembling a rectangle with two oppositely arranged flat sides and two oppositely arranged curved sides.

As shown in FIG. 9, the plurality of semi-circular cutaways 828 may be spaced apart evenly along the z-axis. It will be appreciated that the mixing rod 802 of FIGS. 8A-10 is a non-limiting example of a mixing rod with a plurality of cutaways and other examples may include cutaways of different geometries, dimensions, quantity and spacing without departing from the scope of the present disclosure.

The mixing rod 802 may be inserted in a mixing chamber to mix materials prior to dispensing. The mixing rod 802 is shown enclosed within a mixing chamber 1002 of a mixing and dispensing head 1004, as shown in FIG. 1000. In one example, the mixing and dispensing head 1004 may be used similarly as the mixing and dispensing head 200 of FIGS. 2-5. The mixing chamber 1002 may have a similar shape as the mixing chamber 204 of FIGS. 2-5. The curved outer surfaces 830 of the bottom portion 806 of the mixing rod 802 may contact an inner wall 1006 of the mixing chamber 1002. The inner wall 1006 may have a circular cross-section, taken along the y-x plane, thus the flat side surfaces 908 may be spaced away from the inner wall 1006 of the mixing chamber 1002. Spaces between the side surfaces 908 of the bottom portion 806 of the mixing rod 802 and the inner wall 1006 of the mixing chamber 1002 may be filled with one or more viscous materials that flows into the mixing chamber 1002.

The one or more viscous materials may also fill spaces between each of the plurality of semi-circular cutaways 828 and the inner wall 1006 of the mixing chamber 1002. As the mixing rod 802 rotates, as indicated by arrow 1008, laminar flow at edges of the plurality of semi-circular cutaways 828 is induced, as indicated by arrows 1010. The laminar flow promotes mixing of the one or more viscous materials within the mixing chamber 1002 while contact between the inner wall 1006 of the mixing chamber 1002 and the curved outer surface 830 of the bottom portion 806 of the mixing rod 802 inhibits accumulation of cured material, e.g., hardened material, along the inner wall 1006 of the mixing chamber 1002. In other words, the contact between the inner wall 1006 of the mixing chamber 1002 and the curved outer surface 830 of the bottom portion 806 of the mixing rod 802 has a scraping effect along the inner wall 1006 of the mixing chamber 1002. By staggering placement of each of the plurality of semi-circular cutaways 828 along the length 824 of the bottom portion 806 of the mixing rod 802, e.g., alternating between the right side and the left side along the z-axis, the scraping effect as well as enhanced mixing is propagated along an entire length 1012 of the mixing chamber 1002. The mixing rod 802 of FIGS. 8A-10 may be a preferred embodiment when materials of high viscosity, relatively rapid curing times, or when more than one material is to be dispensed from a mixing and dispensing head.

As shown in FIGS. 2-5, the mixing chamber 204 may include one or more material inlets 240. The embodiment of the mixing and dispensing head 200 shown in FIGS. 2-5 includes three material inlets (only two shown in FIG. 2 and only one shown in FIGS. 3-5). However, in alternate embodiments, there may be a different number of material inlets, such as one, two, four, or more. Each material inlet 240 is disposed within and passes through the mixing chamber wall 210. Further, each material inlet 240 is arranged within the mixing chamber wall 210 at a position proximate to but below the high pressure bearing 214. As shown in FIG. 5, the distance between (a top of) the material inlet 240 and (a bottom of) the high pressure bearing 214 is denoted by $L_0$. As explained further below, the stagnant volume of the mixing chamber is related to $L_0$ and it may be advantageous to decrease $L_0$ as much as possible. Each material inlet 240 is coupled to an individual channel 242 (which may also be referred to as a material pass-through) adapted to flow a material (e.g., liquid) from a material source 244. Each material source 244 may be an additional container or volume in which a material (such as a viscous liquid) is stored. Each material source 244 may be fluidly and/or directly coupled to a pump, such as one of pumps 112 shown in FIG. 1. In some embodiments, the material source 244 may be a chamber of the pump (e.g., positive displacement pump). The pump of each material source 244 may control a flow (e.g., flow rate) of material entering the mixing chamber 204 from the corresponding material inlet 240. For example, as explained below, material (e.g., liquid material) is pumped at a metered rate through one or more channels 242 and into the mixing chamber 204 through one or more material inlets 240. Material from the material source 244 enters the corresponding channel 242 through an inlet 246 which is arranged at a 90-degree angle with channel 242. An open end of each channel 242, which extends past the corresponding inlet 246 is capped by a plug 248.

The mixing rod 206 may not include an O-ring seal around the mixing rod, proximate to the material inlets 240 since the mixing rod 206 is not used to seal the openings of the material inlets 240. Instead, as explained further below, stopping operation (or movement of) the one or more pumps of each material source 244 stops the flow of material into the mixing chamber and thus stops the flow of mixed material from the dispensing nozzle 230. Alternatively, the mixing rod 206 may include an O-ring seal around the mixing rod 206, proximate to the material inlets 240.

As shown in FIG. 4A, the distance between each material source 244 and the central axis 202 is denoted as $R_p$. The length, $R_p$, may be the closest allowable distance that the material source 244 may be placed to the mixing rod 206 due to a footprint, or radius, of the pump adapted to pump material from the material source 244 into the mixing chamber 204 via a corresponding channel 242 and material inlet 240. A draft angle, θ, is defined between a central axis of the material source 244, located at $R_p$, and the material inlet 240 (as shown in FIG. 4A). As shown in FIG. 3, a contour angle, φ, is defined between the central axis 202 and the line connecting the tip of the dispensing nozzle 230 and the outer edge of the mixing head lower body 211.

An example operation of the mixing and dispensing head 200, as well as selection of the geometrical variables of the mixing and dispensing head 200 to increase efficiency of the mixing and dispensing operation, will now be explained with reference to FIGS. 2-5. Material is actively pumped in a metered fashion through one or more channels 242 and material inlets 240 into the mixing chamber 204. Metered flow allows appropriate stoichiometry to be achieved between reactive species (e.g., two or more reactive materials flowed into the mixing chamber).

In one example, the material mixed and dispensed according to the methods and apparatus of the present disclosure includes two or more reactive liquids. The two or more reactive liquids can be a first liquid and a second liquid which react. In this example, the first liquid comprises a first compound having a first chemical structure which includes a first functional group, and the second liquid comprises a second compound having a second chemical structure which includes a second functional group, wherein the first functional group is reactive with the second functional group. The first functional group and the second functional group can react to form reaction polymers such as, for example, epoxies, polyurethanes, and phenolics.

The first liquid and the second liquid can be mixed in various proportions depending upon the concentration of the first compound and the second compound in the liquids, and on the stoichiometry with which the first and second compounds react. The proportions of the first liquid to the second liquid can vary from 100:1 to 1:100, or from 50:1 to 1:50, or from 10:1 to 1:10, or from 5:1 to 1:5, or from 2:1 to 1:2 on a volumetric basis. In the mixture, a ratio of the initial molar equivalents of the first functional group to the initial molar equivalents of the second functional group can vary from 10:1 to 1:10, 5:1 to 1:5, or from 2:1 to 1:2, or from 1.5:1 to 1:1.5.

At least one of the first functional group and the second functional group of the compounds of the first and second liquids can be a saturated functional group. Examples of the saturated functional group include a hydroxyl group, a thiol group, a primary amine group, a secondary amine group, an epoxy group, or any combination thereof.

In one particular example, the first liquid comprises one or more single or multifunctional isocyanate compounds, and the second liquid comprises a second compound including a second functional group which is reactive with the one or more single or multifunctional isocyanate compounds of the first liquid. The isocyanate compound can be a prepolymer or monomer having one or more isocyanate functional groups in its chemical structure. For example, the isocyanate prepolymer can have a number average molecular weight of about 250 Daltons to about 10,000 Daltons, or of about 500 Daltons to about 7,500 Daltons. The second functional group can comprise a hydroxyl group, a primary amine group, a secondary amine group, or any combination thereof. The second compound can be a polyacid compound, a polyol compound, a polyamine compound, or any combination thereof. The polyacid compound can be a diacid compound. The polyol compound can be a diol compound. The polyamine compound can be a diamine compound. In this particular example, when the first and second liquids are mixed, the isocyanate of the first liquid reacts with the second compound of the second liquid, forming a polyurethane. The polyurethane which is the reaction product of mixing the first liquid and the second liquid can be a thermoset polymer. Alternatively, the polyurethane which is the reaction product of mixing the first liquid and the second liquid can be a thermoplastic polymer.

In addition to the first and second compounds, the first liquid, the second liquid, or both can include solvents, fillers, crosslinking agents, coloring agents such as pigments and dyes, strengthening agents such as fibers and graphene, ultra-violet radiation absorbing agents, processing aids, and the like. In some examples, the first liquid, the second liquid, or both, can be substantially free of organic solvents.

When initially mixed, the first and second liquids can have a viscosity of about 5,000 centipoise to about 5,000,000 centipoise, from 50,000 centipoise to 4,000,000 centipoise, or from 20,000 centipoise to 2,000,000 centipoise, as determined at 25 degrees C. at a shear rate of 0.1 inverse seconds. Prior to mixing, the first liquid or the second liquid or both can have a viscosity of from 50 centipoise to 50,000 centipoise, or from 100 centipoise to 20,000 centipoise, or from 200 centipoise to 10,000 centipoise, as determined at 25 degrees C. at a shear rate of 1,000 inverse seconds. Viscosity can be measured using a rheometer with a gap of from 1 millimeter to 2 millimeters, such as an Anton Parr MCR 301 or 302 rheometer.

The first and second liquids can be liquids as described in United States Patent Application Publication No. US 2017/0355865.

The one or more viscous, reactive liquids may be chosen for creating outsoles of footwear. In one embodiment, at least two viscous, reactive liquids may be pumped into and mixed within the mixing chamber. In another embodiment, the mixing chamber may include three material inlets 240 and two different, reactive, liquids may be injected via the three material inlets 240 (e.g., the same first material through two of the three material inlets and a second material through a third of the three material inlets). In some embodiments, when two liquids of the same material are separately injected into the mixing chamber, the two liquids may have different colors or material properties (such as curing times). As such, a desired extruded material color, elasticity, or the like, may be obtained. For example, the at least two viscous, reactive liquids can comprise three or more viscous, reactive liquids each having a different color (e.g., blue, red and yellow; or cyan, yellow, magenta and black, etc.) which can be mixed in different proportions to make a variety of colors (e.g., tints and shades, secondary colors, tertiary colors, etc.). Optionally, when more than three separate viscous, reactive materials are used, the pump head can include four or more inlets and/or there may be four or more material inlets to the mixing chamber.

The pumps used to flow the one or more reactive materials into the mixing chamber (such as pumps 112 shown in FIG. 1) are positive displacement pumps. Positive displacement pumps include, but are not limited to: pistons, cavity pumps, and gear pumps. Additionally, positive displacement pumps allow for the flow of material into the mixing chamber to be controlled by operation of the drive motor(s) operating the one or more pumps. A single revolution of the drive motor corresponds to a specific volume of dispensed material by the pump. In this way, the total amount of mixed reactive material as well as the relative ratios of the each of the materials entering the mixing chamber and thus exiting the dispensing nozzle can be instantaneously controlled by programmed motion of the pumps. For example, in order to stop delivering material to the mixing chamber and out of the dispensing nozzle, the one or more pumps can be stopped. Since the flow of material is stopped by stopping the pumps themselves, it is not necessary to move the mixing rod (in the linear direction, along the z-axis) to seal the material inlets to the mixing chambers and in some cases an O-ring seal may not be needed around the mixing rod.

The rate of deposition of material, through dispensing nozzle 230, is set by the pump flow rate, and the driving force for material flow is the pressure differential between the high pressure at the pump (e.g., at material source 244) and atmospheric pressure at the dispensing nozzle 230. Because there is no other driving force for material to move from the pumps to the dispensing nozzle, an unimpeded and direct path from the material source(s) 244 to the dispensing nozzle 230 is desired. A more direct path may be achieved by positioning each material inlet 240 as close as possible to the high pressure bearing 214. As this length between the material inlet 240 and high pressure bearing 214, $L_0$, is reduced, the volume, $V_s$, of material that can collect in this stagnant region is reduced (see FIG. 5). The Stagnant volume, $V_s$, is related to the length, $L_o$, representing the gap between the material inlet 240 and the bearing 214, and the radius of the mixing rod 206 in the region of the material inlet 240, $R_1$ as:

$$V_s = \pi R_1^2 L_o \tag{1}$$

The length, $L_0$, may be determined by the draft angle, $\theta$, between the material source, located at $R_p$, and the end of the channel 242, at the material inlet 240.

$$R_p \cos(\theta) = L_o \tag{2}$$

The length, $R_p$, represents the closest allowable distance that the material source 244 may be placed to the central axis 202 due to the footprint, or radius, of the pump. The draft angle $\theta$ is decoupled from $R_p$ by incorporating a 90 degree turn in the flow path via the end of the channel 242 which includes a through-hole capped with a plug 248. In this way, $L_0$ is limited only by the minimum distance between the bearing 214 and the channel 242, as determined by machining requirements.

During a mixing and dispensing operation with mixing and dispensing head 200, one or more materials from the one or more material sources 244 (in some embodiments, at least two materials) meet upon entering the mixing chamber 204, where the rotational motion of the mixing rod 206 introduces shear forces that mix the materials within the mixing chamber 204. The mixing rod surface (e.g., outer surface of the mixing rod 206) is depicted as smooth in the figures; however, surface features that produce laminar or turbulent flow may be utilized to improve mixing of high or low viscosity materials, respectively. In one example, surface features may include various surface treatments such as grooves, protrusions, and/or patterns. For the cylinder-in-cylinder geometry depicted in FIGS. 2-5, the degree of mixing experienced by the materials is proportional to the shear, Y, imparted by the rotational motion of the mixing during the residence time, $t_r$, of the materials inside the mixing chamber 204. The shear imparted by the mixing rod 206 is the ratio of the distance, d, traveled by the surface of the mixing rod 206 and the gap, G, between the mixing rod 206 and the mixing chamber wall 210:

$$Y = d/G \quad (3)$$

The residence time is the elapsed time between entering the mixing chamber 204 through the material inlet(s) 240 and exiting the mixing chamber 204 through the dispensing nozzle 230. The residence time is therefore the ratio of the mixing chamber volume, $V_m$, and the flow rate, v (e.g., flow rate of material through and out of the mixing and dispensing head):

$$t_r = V_m/v \quad (4)$$

The distance, d, traveled by the surface of the mixing rod 206 during the residence time is the product of the mixing motor speed, RPM, and the average radius of the of the mixing rod 206, $R_{ave}$, where $R_{ave}$ is the average of $R_1$ and $R_2$ over the length of the mixing chamber:

$$d = t_r * RPM * R_{ave} \quad (5)$$

The totality of variables that influence the degree of mixing, $D_m$, can then be tied together as:

$$D_m = Y = (RPM * V_m * R_{ave})/(v * G) \quad (6)$$

The interdependence of these variables is of key relevance to the design of the mixing chamber 204, as outlined below.

The dead volume, $V_d$, of the system is the portion of the interior volume (of the mixing chamber 204) occupied by mixed material during operation. It is generally advantageous to have as small a dead volume as possible for rapid transitions in composition of the dispensed material. This is because changes to the relative ratios of mixed components will not reach the dispensing nozzle 230 until one full dead volume of material has been dispensed. In order to maximize mixing, it is desirable that the dead volume be comprised entirely of the mixing chamber, according to:

$$V_m = V_d \quad (7)$$

Therefore, it may be desirable to account for the relationship between the dead volume and the degree of mixing. That is, if the dead volume is reduced, the RPM and/or radius of the mixing rod 206 must be increased, or the flow rate and/or gap length must be decreased in order to maintain a desired degree of mixing. A practical limit may be placed on the mixing rod RPM by the size and power consumption of the motor, which is dependent on the viscosity of the materials used. Similarly, the size and power consumption of the pumps places a lower limit on G, as the gap length influences the pressure required to achieve a given flowrate. An additional factor influencing the dead volume is the gel time, $t_g$, of the mixed reactive species. The residence time must be smaller than the gel time so that the reactive material does not solidify inside the mixing chamber 204 and clog the dispenser. Thus:

$$t_r < t_g \quad (8)$$

Therefore, the gel time puts an upper limit on the residence time, and thus the ratio of dead volume to flow rate. The available variables for accommodating a decreased dead volume and the challenges associated with each are summarized in the table below:

| Variable | Change | Challenges |
|---|---|---|
| $R_{ave}$ | Increased | Larger footprint, increased torque on mixing motor |
| RPM | Increased | Increased load on mixing motor |
| G | Decreased | Higher pump pressure required to maintain flow, Increased torque on mixing motor |
| v | Decreased | Slower deposition, risk of gelation inside Mixing Chamber |

Once the appropriate dead volume has been selected by considering each of the relevant factors, the geometry of the mixing chamber 204 can be determined. For a concentric mixing design such as the one described here, the dead volume is an annular prism:

$$V_d = (\pi(R_{ave}+G)^2 - \pi R_{ave}^2) * L_2 \quad (9)$$

It is advantageous to maximize $L_2$ in order to extend the dispensing nozzle 230 as far as possible from the mixing portion of the mixing and dispensing head 200. Such protrusion aids the dispensing nozzle 230 in navigating a substrate with surface contours. The maximum contour angle, Φ, able to be accommodated by the dispenser is that drawn between the central axis 202 and the line connecting the tip of the dispensing nozzle 230 and the outer edge of the mixing head lower body 211.

As described above, the mixing chamber 204 has a high aspect-ratio shape, with large $L_2$ and small G and $R_{ave}$. For fluid flow through a pipe with a given volume, the pressure required increases with the aspect ratio of the pipe. Therefore, significant pressure is required to flow high-viscosity fluids through this system. The internal volume of any system is a function of the pressure within the system. For a fluid pump, this results in swelling of the interior volume, $V_i$, during operation as a result of the pressure, P, associated with moving the fluid. A pump compliance, $C_v$, can therefore be defined as the change in internal volume of the pump as a function of flow rate:

$$V_i \sim P \quad (10)$$

$$P \sim v \quad (11)$$

$$V_i = V_0 + C_v v \quad (12)$$

This results in a virtual flow, or "compliance flow," $v_c$, into or out of the pump whenever there is a change in flow rate supplied by the pumps:

$$v_c = -v'C_v \quad (13)$$

The total flow from the dispensing nozzle 230, $v_t$, is then a function of the flow rate of the pump, $v_p$, as well as the acceleration of the pump:

$$v_t = v_p + v_c \quad (14)$$

$$v_t = v_p - v_p'C_v \quad (15)$$

Figure 6:
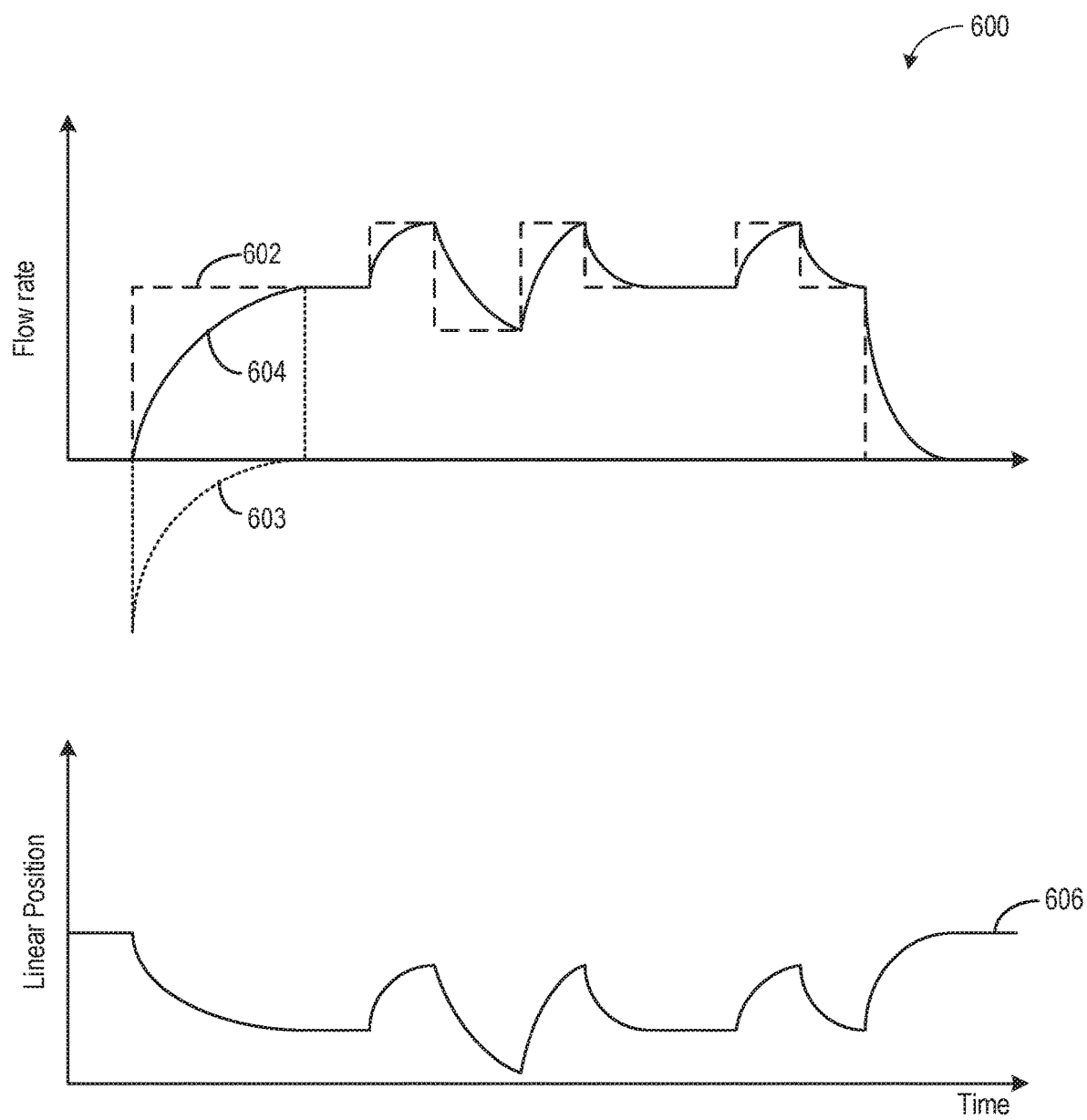
FIG. 6 shows a graph of a response of a total flow rate to step changes in pump flow rate for a mixing and dispensing head.

This poses a challenge to making rapid changes in flow rate, such as when starting or stopping deposition. FIG. 6 depicts a graph 600 of the response of the total flow rate 604 to step changes in pump flow rate 602. The total flow rate 604 takes time to respond to the changes of the pump. This results in lag, or insufficient flow when flow rate is increased, and drool, or excess flow when flowrate is decreased. The compliance flow rate 603 is also partially shown at the beginning of graph 600.

The mixing head described herein mitigates lag and drool effects by utilizing piston motion (e.g., linear motion along central axis 202) of the mixing rod 206 to adapt the interior volume of the system to counteract volume changes resulting from the pressures associated with fluid flow. FIG. 6 shows example changes to the linear position 606 of the mixing rod as the pump flow rate 602 and total flow rate 604 change. In this way, adjustments to the linear position of the mixing rod within the mixing chamber compensates for the changing pump flow rates, thereby mitigating drool effects and allowing the creation of multi-scale features from a single pass of the dispensing nozzle (e.g., features of different sizes or thickness in a single line of movement of the nozzle).

The interior volume of the system is related to the linear position of the mixing rod 206, x, and radius of the mixing rod 206 at the high pressure bearing 214, $R_1$, as:

$$V_i = V_0 + \pi R_1^2 x + C_v V \quad (16)$$

To keep the interior volume constant, i.e. $V_i = V_0$:

$$\pi R_1^2 x = -C_v v \quad (17)$$

Thus, the linear position of the mixing rod 206, x, is directly related to the flow rate, v, by the pump compliance, which can be determined by calibration. It follows that the rate of change of interior volume of the mixing chamber 204 is directly related to $R_1$; therefore, rapid changes in $V_i$ are made possible by a larger mixing rod radius (e.g., larger $R_1$ and/or $R_2$). However, as outlined previously, it is advantageous for the mixing rod 206 to have a small diameter on average. For this reason, the mixing rod is designed with two radii, $R_1$ and $R_2$. The length, $L_1$, of the mixing rod 206 between the bearing 214 and the taper 238 determines the dynamic volume, $V_D$, which is the maximum change in interior volume achievable by movement of the mixing rod 206. The dynamic volume is determined by the maximum flowrate of the system, $V_{max}$, and the pump compliance:

$$\pi R_1^2 L_1 = C_v v_{max} \quad (18)$$

By choosing the appropriate dynamic volume and mixing rod radius, rapid adjustments can be made to maintain consistent interior volume making possible precise dispensing even during rapid changes in flowrate.

The functional advantage of precision deposition at variable flowrates and rapid adjustment of flow rate is the ability to create multi-scale features from a single pass of the dispensing nozzle of the mixing and dispensing head. Typically, structures created by extrusion are deposited via a raster pattern of multiple passes of the nozzle, each depositing a line of material with fixed width. Large features are made up of many passes while smaller features are made up of fewer passes. Structures containing both small and large features therefore require many passes of very fine lines, which results in slow overall speeds. A second drawback to this method is that the final surface of the structure has a stepped or ribbed appearance. The mixing and dispensing head described herein, such as mixing and dispensing head 200 shown in FIGS. 2-5, allows for smooth, multi-scale features to be extruded in a single pass of the dispensing nozzle due to its unique ability to achieve rapid changes in material flow rate. Specifically, the structure and operation of the mixing and dispensing head described herein allows for the width of the extruded line (e.g., the line of material dispensed from the dispensing nozzle and deposited onto the substrate or deposition surface) to be changed by varying the ratio of the material flow rate to the linear speed of the dispensing nozzle (of the mixing and dispensing head). When the flow rate of material from the dispensing nozzle is fast relative to the dispensing nozzle speed, the material over-extrudes, resulting in a line that is wider than the nozzle opening. Conversely, when the flow rate of material from the dispensing nozzle is slow relative to the dispensing nozzle speed, the material under-extrudes and can be drawn out as a capillary bridge, producing a line that is thinner than the nozzle opening. In one embodiment, the mixing and dispensing head described herein may be capable of producing extruded line widths in a range of 0.1 to 4 times the dispensing nozzle diameter.

Variable-width lines involve simultaneous control of multiple axes of the material delivery system (e.g., system 100 shown in FIG. 1). Instructions and/or programs stored on memory of a controller, such as controller 118 shown in FIG. 1, are used to link a desired line width (according to a digital, 3D model uploaded to the controller) to axis commands of a gantry of the mixing and dispensing system. For example, a line width of X corresponds to a ratio (Y) of nozzle linear speed, S, and pump flow rate, v: s/v=Y. There may be infinite solutions which result in the same value of the ratio Y. Thus, the controller may determine the nozzle linear speed S and pump flow rate v that produces the fastest print speed for the practical limits (e.g., operational boundaries or ranges) to both S and v. Once the flow rate v has been selected, the speed (RPM) of the mixing motor (e.g., motor 116 shown in FIG. 1) of the mixing rod (e.g., the rotational speed of the mixing rod) may be adjusted based on the residence time of the material in the mixing chamber in order to achieve the minimum degree of mixing at the lowest stress on the mixing motor and with minimal production of heat. The distance, z, between the dispensing nozzle and the substrate (e.g., deposition surface) may also be adjusted in order to maintain fluid contact between the nozzle and substrate when extruding thin lines, and to avoid embedding the nozzle in the fluid when extruding thicker lines. The distance z is roughly equivalent to the diameter of the extruded line. As described previously, the linear position of the mixing rod, in the z-direction, is adjusted based on the flowrate in order to maintain: $\pi R_1^2 x = -C_v v$.

The specifications (e.g., geometrical and operational parameters) for the mixing and dispensing head described herein may be at least partially selected for a desired material and application. As one example, the mixing and dispensing head may be used with viscous, reactive liquids to create outsole components for footwear. As explained above, the specifications for the mixing and dispensing head are interrelated. Thus, the lower and upper bounds for the flow rate (and their associated linear speeds) and the print time per layer of material deposited may fully define the system, as described in the table below. For example, assuming a set average volume of a footwear outsole (e.g., 28400 $mm^3$), an average surface area for deposition of material (e.g., 14194 $mm^2$), an average production time (e.g., 16 min), and extrusion line width (e.g., 1 mm), the upper and lower bounds for the flow rate and the print time per layer may be determined (e.g., 14 mL/min, 1.8 mL/min, and 1-8 min, respectively). The remaining specifications of the mixing and dispensing head may be determined according to the relationships described above (see equations 1-18). For one example mixing and dispensing head used to create outsole components for footwear, the mixing and dispensing head may have the specifications defined in the table below:

| Variable | Values: Range A | Values: Range B | Values: Range C | Driving factors |
|---|---|---|---|---|
| $V_s$ (microliters) | 1-10 | 2-8 | 5-6 | $V_s = \pi R_1^2 L_o$ |
| $R_1$ (millimeters) | 0.7-15 | 1.5-6.0 | 3.0-3.4 | Optimized for compliance according to: $R_1^2 > C_v v_{max}/\pi L_1$ |
| $L_o$ (millimeters) | 0.1-2.0 | 0.5-1.5 | 0.8-1.2 | Minimum length according to machining limitations |
| $R_p$ (millimeters) | 1-20 | 3-7 | 4.3-4.7 | Viscotec Preeflow eco-PEN450 (29 mm width) |
| $\Theta$ (degrees) | 15-70 | 20-60 | 30-50 | $R_p$, $L_0$ |
| G (millimeters) | 0.05-1.50 | 0.12-0.70 | 0.25-0.35 | Adjusted in parallel with $R_{ave}$ to keep pressure below 200 PSI due to 250 PSI bearing capacity. Empirically determined |
| $V_m$ (microliters) | 18-650 | 45-260 | 90-130 | Chosen according to flow rates in order to keep $t_r < t_g/10$ |
| $V_d$ (microliters) | 18-650 | 45-260 | 90-130 | Roughly equal to mixing chamber volume, by design |
| $t_r$ (seconds) | 0.1-100 | 3-50 | 0.4-4.0 | $t_r < t_g/10$ to avoid viscosity buildup due to reaction |
| $t_g$ (seconds) | 10-1000 | 30-500 | 45-55 | Gel time less than minimum build time of one layer |
| V (milliliters per minute) | 0.4-70 | 0.9-28 | 1.8-14 | Optimized for footwear component production pace |
| RPM (revolutions per minute) | 120-24000 | 300-10000 | 600-4800 | Adjusted according to $R_{ave}$, v, $V_d$ |
| $R_{ave}$ (millimeters) | 0.3-15 | 0.8-6.0 | 1.7-3.0 | Adjusted in parallel with G to accommodate $L_2$ and P < 200 PSI |
| $Y/D_m$ | 40-1100 | 107-440 | 215-220 | Empirically determined minimum for chosen materials system |
| $L_2$ (millimeters) | 4-125 | 12-50 | 23-27 | Chosen for $\Phi$ = 45 degrees |
| $\Phi$ (degrees) | 20-85 | 35-55 | 43-47 | Estimated maximum contour of footwear outsole |
| $C_v$ (minutes) | 0.1-10 | 2.5-7.5 | 4.8-5.2 | Empirically determined |
| $L_1$ (millimeters) | 1-10 | 2-5 | 2.8-3.2 | Travel limit of linear actuator coupled to mixing motor |

Figure 7:
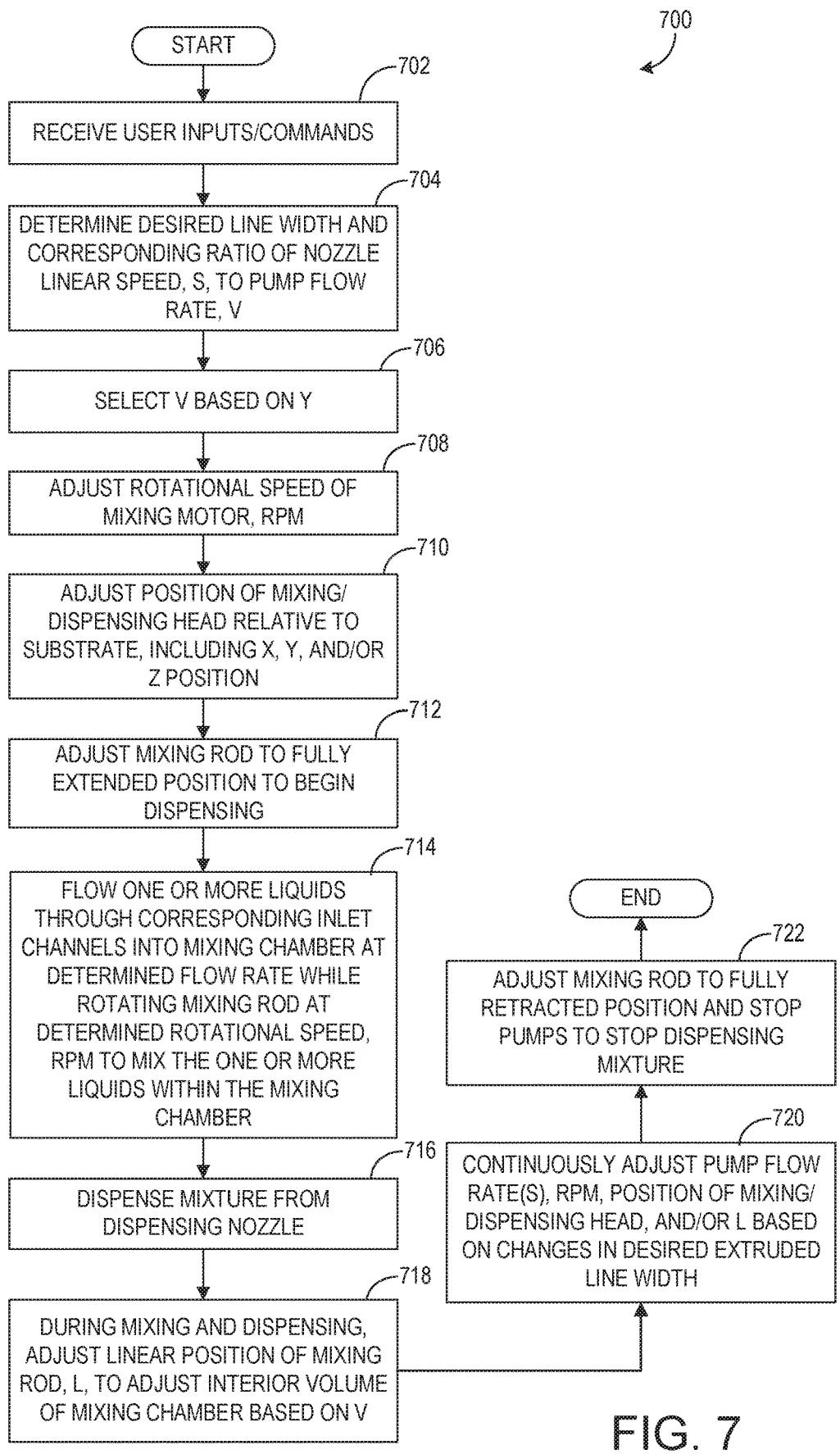
FIG. 7 shows a flow chart of a method for mixing and dispensing one or more liquids via a mixing and dispensing head system.

FIG. 7 shows a flow chart of a method 700 for mixing and dispensing one or more liquids via a mixing and dispensing head system. In one example, the mixing and dispensing head system may be system 100 of FIG. 1 and include a mixing and dispensing head, such as the mixing and dispensing head 200 shown in FIGS. 2-5. In another example, the mixing and dispensing head may be the mixing and dispensing head 1004 of FIG. 1, adapted with the mixing rod 802 of FIGS. 8A-10. The mixing and dispensing head may be used to print structures, such as outsole components for footwear, in one example. Instructions for carrying out method 700 may be executed by an electronic controller of the mixing and dispensing head system (e.g., controller 118 shown in FIG. 1) based on instructions stored on a memory of the controller and in conjunction with data uploaded to the controller (such as a 3D computer model) and signals received from sensors/components of the system, such as flow rate sensors of one or more pumps (e.g., pumps 112 shown in FIG. 1), speed sensors of one or more motors (e.g., motor 116 and a motor of gantry 104 shown in FIG. 1), and position sensors of the dispensing nozzle of the mixing and dispensing head and gantry.

Method 700 begins at 702 by receiving user inputs and/or commands. As one example, user inputs and/or commands may include data from one or more computer models (such as a CAD model) that has been uploaded to and stored within memory of the controller. The data from the computer model may include multi-dimensional data corresponding to a desired structure to be printed via the mixing and dispensing head. The controller may generate position commands (e.g., x, y, z coordinate) for moving the mixing and dispensing head, relative to a substrate or deposition surface, via a motor of a gantry of the system and determine desired line widths of the structure to be extruded (e.g., deposited) from the mixing and dispensing head from the computer model data. In alternate embodiments, a user may input, manually at the controller or over a wireless network, structural data such a desired line width and/or coordinates for creating a desired structure.

At 704, the method include determining a desired line width (of the structure) to be created via the mixing and dispensing head and a corresponding ratio, Y, of dispensing nozzle linear speed, S, to pump flow rate, v. The controller may determine the desired line width by looking up data in the uploaded computer model that corresponds to the desired width of the extruded line to be created from material deposited from the mixing and dispensing head. As discussed above, the desired line width may change within a single structure and line (e.g., pass) of the mixing and dispensing head. In one example, the desired line width may be in a range of 0.1 to 4 times the nozzle diameter of the dispensing nozzle of the mixing and dispensing head. As explained above, a line width of X may correspond to a ratio, Y, of nozzle linear speed S to pump flow rate v. In one example, the controller may look up the ratio Y in a look-up table stored in memory of the controller where line width X, as determined from user inputs and/or uploaded computer models, is the input to the table and Y is the output. In another example, the controller may make a logical determination of the ratio Y based on logic rules that are a function of desired line width X.

After determining the ratio Y, the method continues to 706 to select the pump flow rate v based on the determined ratio Y. There may be practical limits (e.g., upper and lower threshold values or bounds) to the pump flow rate v of the one or more material pumps and nozzle linear speed S of a motor of a gantry or system adapted to adjust an x, y, and/or z position of the mixing and dispensing head (and thus the dispensing nozzle of the mixing and dispensing head). These upper and lower thresholds for v and S may be stored within the controller memory and thus the controller may select a value for pump flow rate that is within these thresholds. In one example, the controller may determine the pump flow rate that produces the fastest print speed, for the ratio Y and that fits within the upper and lower thresholds for v and S. In one example, the controller may look up the pump speed in a look up table, which may be empirically determined based on the upper and lower thresholds for v and S and fastest possible print speeds, where Y is the input and v is the output. In another example, the controller may make a logical determination of the pump flow rate v based on logic rules that are a function of the ratio Y and the upper and lower thresholds for v and S. The controller may also determine a corresponding pump command for each material pump (e.g., one or more pumps) for the determined pump flow rate. In one embodiment, if there are two or more material pumps (pumping two or more materials into the mixing chamber), the pump flow rate v explained above may be a total flow rate of material from the mixing and dispensing head. Thus, at 706, the controller may determine the individual pump flow rates of the two or more pumps to achieve the total flow rate v and then determine the corresponding pump commands for the two or more pumps.

The method continues on to 708 to set and/or adjust a rotational speed of the mixing motor (e.g., motor 116 shown in FIG. 1), and thus the rotational speed of the mixing rod driven by the mixing motor, RPM. In one example, the controller may determine the rotational speed of the mixing motor based on the residence time of the material in the mixing chamber (e.g., the material injected into the mixing chamber via the one or more pumps) in order to achieve a minimum degree of mixing at the lowest stress on the mixing motor and with minimal production of heat. The residence time of the material in the mixing chamber may change based on the material(s) used and may be input to the controller by a user and/or included within the data uploaded to the controller. In one example, the controller may look-up, using a look-up table stored in the controller memory, the mixing motor rotational speed with the material residence time as the input and the rotational speed as the output and then set the rotational speed of the motor at the determined rotational speed value.

At 710, the method includes adjusting the position of the mixing and dispensing head relative to the substrate (e.g., deposition surface 108 shown in FIG. 1), including the x, y, and/or z position of the mixing and dispensing head (see coordinate axes 120 in FIGS. 1-5). For example, the controller may determine the x, y, and/or z position of the mixing and dispensing head based on the data of the computer model uploaded to the controller memory and then send commands (e.g., electrical signals) to one or more motors directly coupled to the mixing and dispensing head or a gantry of the mixing and dispensing head to move the mixing and dispensing head into the determined position. The z position of the mixing and dispensing head may include the distance, Z, between the dispensing nozzle and the substrate (e.g., deposition surface). The distance Z may be adjusted during a mixing and dispensing operation in order to maintain fluid contact between the dispensing nozzle and substrate when extruding thin lines, and to avoid embedding the nozzle in the fluid when extruding thicker lines. For example, the controller may determine the distance Z to be roughly equivalent to a desired diameter (e.g., width) of the extruded line, as determined at 704. In some examples, the controller may determine separate (e.g., three) commands for the determined x, y, and z position of the mixing and dispensing head. In alternate examples, the controller may generate one command corresponding to the final, x, y, z, position of the mixing and dispensing head and send the one command to the actuator of the motor adapted to move the mixing and dispensing head.

The method continues to 712 to adjust the mixing rod of the mixing and dispensing head (e.g., mixing rod 206 shown in FIGS. 2-5) into the fully extended position to begin the mixing and dispensing operation and print the desired structure. In one example, the method at 712 may include the controller sending a command to the motor of the mixing rod to linearly move the mixing rod, at least along the z-axis shown in FIGS. 1-5, into the fully extended position (as described above) where the distal end of the mixing rod is arranged adjacent to the dispensing nozzle of the mixing and dispensing head. The fully extended position may be the linear position of the mixing rod where the mixing rod is closest to the end of the dispensing nozzle.

At 714, the method includes flowing one or more liquids (e.g., materials) from a pump (one for each material) and through a corresponding inlet channel and material inlet into the mixing chamber of the mixing and dispensing head at the determined flow rate(s) (as determined at 706) while rotating the mixing rod at the determined rotational speed (as determined at 708) to mix the one or more liquids within the mixing chamber. Flowing the one or more liquids at 714 may include the controller sending individual pump commands, as determined at 706 based on the desired total flow rate of material from the dispensing nozzle, to the one or more pumps. The determined pump commands may be a flow amount or flow rate command. Additionally, rotating the mixing rod may include, at the same time as sending the determined pump commands to actuators of the one or more pumps, sending a motor command to a motor coupled to the mixing rod to rotate the mixing rod at the determined rotational speed.

The method continues to 716 to dispense the mixed mixture of the one or more liquids from the mixing chamber via the dispensing nozzle of the mixing and dispensing head. The method at 716 may occur simultaneously and/or continuously with the method at 714. At 718, the method includes, during the mixing and dispensing operation (e.g., during the methods at 714 and 716), adjusting the linear position of the mixing rod, L (or x, as used in the equations described above), to adjust the interior volume of the mixing chamber based on the pump flow rate, v. In one example, the method at 716 may include the controller determining the linear position of the mixing rod, in the direction of the z-axis shown in FIGS. 1-5 (e.g., in a direction relative to gravity and the substrate for deposition), based on changes in the pump commands of the one or more material pumps. For example, in one example, the controller may make a logical determination of the linear position L of the mixing rod based on logic rules that are a function of a sum of changes in each pump command (of each pump), multiplied by a gain value. In another example, the controller may look up, in a look-up table stored in memory of the controller, the linear position L of the mixing rod where changes in the pump commands of the one or more pumps are inputs and L is the output.

The method continues to 720 to continuously adjust the pump flow rate(s) (e.g., the pump commands of the one or more material pumps), rotational speed of the mixing rod motor, the position of the mixing and dispensing head (e.g., x, y, and/or z position), and/or linear position L of the mixing rod based on changes in the desired extruded line width X and additional data of the uploaded computer model. The method at 720 may include continuously repeating the methods at 704-718, as described above. For example, the linear position L of the mixing rod may be continuously adjusted based on changes in the pump commands. In this way, material may continue to flow from the dispensing nozzle at a total desired flow rate while the mixing and dispensing head is moved at a desired linear speed in order to produce an extruded line of a desired width and/or pattern. This continuous adjustment process may allow fine details and more precise structures to be printed at a faster rate.

At 722, the method includes adjusting the linear position of the mixing rod to the fully retracted position (e.g., as shown by dashed line 250 in FIG. 4A) and stopping the one or more material pumps in response to a request to stop dispensing the mixture from the dispensing nozzle of the mixing and dispensing head. For example, when a line of material is complete, as determined from the data of the uploaded computer model of the structure to be created, the controller may send a command to the pumps to stop flowing material into the mixing chamber while at the same time sending a command to the motor of the mixing rod to linearly move the rod into the retracted position and away from the end of the dispensing nozzle. This action of retracting the mixing rod may break the capillary bridge of the dispensed material via an upward sucking motion that is created by retracting the mixing rod upward and away from the dispensing nozzle. As a result, the mixing and dispensing head may stop dispensing material and excess material may not be deposited on the substrate. Further, as explained above, by utilizing a mixing rod capable of moving linearly upward and positive displacement pumps capable of stopping the flow of material, a sealing system between the mixing rod and mixing chamber and the material channels is not necessary. For example, a sealing O-ring between the mixing rod and mixing chamber may be excluded from the mixing and dispensing head system. In this way, the linear motion of the mixing rod may be performed only during the mixing and dispensing operation (and to start/stop the mixing and dispensing operation) and is not used to seal the mixing chamber from the material sources during non-operation (e.g., no mixing and dispensing) of the system.

In this way, by utilizing a mixing and dispensing head system, with the geometrical specifications as described herein, and adapted to produce variable flow rates and adjust an interior volume of the mixing chamber as pump flow rates changes (via linear motion of the mixing rod while the mixing rod is also being rotated for mixing), the flow rate of mixed material may be more rapidly changed, thereby providing the ability to create multi-scale features of different widths (and more detail) with a single pass (e.g., single line of movement) of the mixing and dispensing head. This may result in the creation of a desired structure with more precision, at a faster speed, as compared to systems that require multiple passes to create structures of varying line widths. The mixing and dispensing head described herein may also produce smoother features (without stepped or ribbed appearance). Thus, the technical effect of, during a mixing and dispensing operation with a mixing and dispensing head of a multi-dimensional printing apparatus, adjusting linear movement of a mixing rod positioned within a mixing chamber of the mixing and dispensing head, at least along a central axis of the mixing chamber, based on an operating condition of the printing apparatus, is to create smooth, multi-scale features more precisely and in a shorter amount of time.

It will further be appreciated by those skilled in the art that although the invention has been described by way of example with reference to several embodiments it is not limited to the disclosed embodiments and that alternative embodiments could be constructed without departing from the scope of the invention as defined in the appended claims.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a mixing and dispensing operation of a multi-dimensional printing apparatus having a mixing and dispensing head, comprising:
    flowing one or more liquids into a mixing chamber via one or more material inlets arranged in a wall of the mixing chamber below a high pressure bearing of a mixing rod of the mixing and dispensing head positioned within the mixing chamber; and
    adjusting movement of the mixing rod positioned within the mixing chamber based on an operating condition of the printing apparatus,
    wherein the mixing rod has a mixing rod upper portion, a mixing rod lower portion, and a first mixing rod tapered section between the mixing rod upper portion and the mixing rod lower portion,
    wherein the mixing chamber has a mixing chamber upper portion, a mixing chamber lower portion, and a first mixing chamber tapered portion between the mixing chamber upper portion and the mixing chamber lower portion,
    wherein the first mixing chamber tapered portion is below the one or more material inlets, and
    wherein adjusting the movement of the mixing rod includes moving the mixing rod between a retracted position and an extended position, wherein, in the extended position, the first mixing rod tapered portion is below the one or more material inlets, and in the retracted position, the first mixing rod tapered portion is at least partially above the one or more material inlets.

2. The method of claim 1, wherein flowing the one or more liquids into the mixing chamber includes operating one or more positive displacements pumps coupled to the material inlets and wherein the operating condition of the printing apparatus includes a velocity of the one or more positive displacements pumps.

3. The method of claim 2, wherein the adjusting movement of the mixing rod includes continuously adjusting a linear position of the mixing rod along a central axis, relative to the mixing chamber, the movement of the mixing rod further including rotation of the mixing rod about the central axis.

4. The method of claim 3, further adjusting a speed of rotation of the mixing rod driven by a mixing motor based on a residence time of the one or more liquids in the mixing chamber, the residence time being a function of a volume of the mixing chamber and a flow rate of the one or more liquids into the mixing chamber.

5. The method of claim 3, further comprising, adjusting one or more of the velocity of the one or more positive displacement pumps, the rotational speed of the mixing rod, a position of the mixing and dispensing head based on a desired extruded line width.

6. The method of claim 3, further comprising, mixing the one or more liquids in the mixing chamber while adjusting the movement of the mixing rod, and dispensing a mixture of the one or more liquids from a dispensing nozzle positioned at an end of the mixing chamber, the mixing and dispensing occurring concurrently.

7. The method of claim 6, wherein the dispensing is initiated by adjusting the linear position of the mixing rod to a fully extended position where a distal end of the mixing rod is arranged adjacent to the dispensing nozzle, the mixing rod including a set of straight cutaways extending along a length of a bottom portion of the mixing rod and forming flat side surfaces of the mixing rod.

8. The method of claim 7, further comprising, in response to a request to stop dispensing the mixture, adjusting the linear position of the mixing rod to a fully retracted position and stopping the one or more positive displacement pumps, the fully retracted position including the distal end of the mixing rod being positioned away from an outer aperture of the dispensing nozzle by a threshold distance.

9. The method of claim 1, wherein the mixing rod upper portion has a first radius, and the mixing chamber upper portion has a first outer diameter and, the mixing rod lower portion has a second radius, and the mixing chamber lower portion has a second outer diameter, and wherein the first radius is larger than the second radius and the first outer diameter is larger than the second outer diameter.

10. The method of claim 1, wherein a travel distance between the retracted position and the extended position is 2.5 to 3.5 mm.

11. The method of claim 1, wherein the mixing rod is continuously adjustable into a plurality of positions between the retracted position and the extended position.

12. The method of claim 1, wherein a travel distance between the retracted position and the extended position is equal to a distance between a lower portion of the high pressure bearing and a top of the first mixing chamber tapered portion.

13. The method of claim 1, wherein, in the extended position, the first mixing rod tapered portion is at least partially received in the first mixing chamber tapered portion.

14. The method of claim 1, wherein the mixing rod lower portion has a second mixing rod tapered portion at a bottom end of the mixing rod.

15. The method of claim 14, wherein the mixing chamber lower portion has a second mixing chamber tapered portion at a bottom end of the mixing chamber.

16. The method of claim 15, wherein, in the extended position, the second mixing rod tapered portion is at least partially received in the second mixing chamber tapered portion.

* * * * *